(12) United States Patent
Bartfai-Walcott et al.

(10) Patent No.: US 12,022,323 B2
(45) Date of Patent: *Jun. 25, 2024

(54) CONNECTIVITY SERVICE LEVEL ORCHESTRATOR AND ARBITRATOR IN INTERNET OF THINGS (IOT) PLATFORMS

(71) Applicant: Intel Corporation, Santa Clara, CA (US)

(72) Inventors: Katalin K. Bartfai-Walcott, El Dorado Hills, CA (US); Hassnaa Moustafa, Sunnyvale, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/549,728

(22) Filed: Dec. 13, 2021

(65) Prior Publication Data

US 2022/0322138 A1    Oct. 6, 2022

Related U.S. Application Data

(63) Continuation of application No. 16/384,276, filed on Apr. 15, 2019, now Pat. No. 11,202,228, which is a
(Continued)

(51) Int. Cl.
*H04W 28/06* (2009.01)
*H04L 41/0896* (2022.01)
(Continued)

(52) U.S. Cl.
CPC ......... *H04W 28/06* (2013.01); *H04L 41/0896* (2013.01); *H04L 41/5025* (2013.01);
(Continued)

(58) Field of Classification Search
None
See application file for complete search history.

(56) References Cited

U.S. PATENT DOCUMENTS 10,306,513 B2 * 5/2019 Bartfai-Walcott .................... H04L 41/5025
11,202,228 B2 * 12/2021 Bartfai-Walcott .................... H04L 41/5025
(Continued)

FOREIGN PATENT DOCUMENTS

| WO | 2012166671 | 12/2012 | |
|---|---|---|---|
| WO | WO-2012166671 A1 * | 12/2012 | ............ H04W 12/08 |
| WO | 2017035536 | 3/2017 | |

OTHER PUBLICATIONS

European Patent Office, "Communication pursuant to Article 94(3) EPC," issued in connection with Application No. 18191352.6, dated Nov. 7, 2019, 7 pages.
(Continued)

*Primary Examiner* — Shripal K Khajuria
(74) *Attorney, Agent, or Firm* — HANLEY, FLIGHT & ZIMMERMAN, LLC

(57) ABSTRACT

Disclosed embodiments relate to an orchestrator and arbitrator in an Internet of Things (IoT) platform. In one example, a method of servicing a plurality of data flows of a plurality of wireless devices using a plurality of protocols includes: monitoring one or more interfaces that communicate using the plurality of protocols, activating a first interface upon detecting a demand to exchange data thereon, wherein a connectivity manager performs the monitoring, and activating, extracting, by a packet analyzer, packet metadata from one or more of the plurality of data flows, determining latency encountered and bandwidth utilized by the one or more data flows based on the packet metadata, applying, by an adaptive connectivity manager (ACM), a latency reduction strategy to attempt to comply with latency criteria, and applying, by a bandwidth utilization manager (BUM), a bandwidth reduction strategy to attempt to comply with bandwidth criteria.

21 Claims, 19 Drawing Sheets

Related U.S. Application Data continuation of application No. 15/720,094, filed on Sep. 29, 2017, now Pat. No. 10,306,513.

(51) Int. Cl.
| | |
|---|---|
| *H04L 41/5025* | (2022.01) |
| *H04L 43/04* | (2022.01) |
| *H04L 45/24* | (2022.01) |
| *H04L 47/32* | (2022.01) |
| *H04L 49/90* | (2022.01) |
| *H04L 67/12* | (2022.01) |
| *H04W 4/70* | (2018.01) |
| *H04W 28/02* | (2009.01) |
| *H04L 43/0852* | (2022.01) |
| *H04L 43/0882* | (2022.01) |
| *H04L 43/16* | (2022.01) |
| *H04L 47/28* | (2022.01) |
| *H04L 47/783* | (2022.01) |
| *H04L 69/18* | (2022.01) |
| *H04W 28/20* | (2009.01) |
| *H04W 88/08* | (2009.01) |
| *H04W 88/10* | (2009.01) |

(52) U.S. Cl.
CPC ............. *H04L 43/04* (2013.01); *H04L 45/24* (2013.01); *H04L 47/32* (2013.01); *H04L 49/90* (2013.01); *H04L 67/12* (2013.01); *H04W 4/70* (2018.02); *H04W 28/0231* (2013.01); *H04L 43/0852* (2013.01); *H04L 43/0882* (2013.01); *H04L 43/16* (2013.01); *H04L 47/28* (2013.01); *H04L 47/783* (2013.01); *H04L 69/18* (2013.01); *H04W 28/20* (2013.01); *H04W 88/08* (2013.01); *H04W 88/10* (2013.01)

(56) References Cited

U.S. PATENT DOCUMENTS

| | | | |
|---|---|---|---|
| 2010/0189084 | A1 | 7/2010 | Chen et al. |
| 2012/0281715 | A1 | 11/2012 | Shojania et al. |
| 2013/0031200 | A1 | 1/2013 | Gulati et al. |
| 2014/0269292 | A1 | 9/2014 | Kalkunte et al. |
| 2014/0337473 | A1* | 11/2014 | Frusina ............... H04N 21/6377 709/217 |
| 2015/0309951 | A1 | 10/2015 | Breakstone et al. |
| 2017/0048308 | A1 | 2/2017 | Qaisar |
| 2017/0250916 | A1 | 8/2017 | Peri et al. |
| 2018/0152517 | A1 | 5/2018 | Zhong et al. |
| 2018/0337814 | A1* | 11/2018 | Hassan ............... H04L 27/0008 |

OTHER PUBLICATIONS

Ashraf et al., "Sleep Mode Techniques for Small Cell Deployments," IEEE Communications Magazine, vol. 49 (8), Energy Efficiency in Communications, dated Aug. 1, 2011, pp. 72-79, 8 pages.

Claussen, et al., "Dynamic Idle Mode Procedures for Femtocells," Bell Labs Technical Journal, vol. 15 (2), Sep. 1, 2010, 22 pages.

European Patent Office, "Extended European Search Report," issued in connection with Application No. 18191352.6, dated Feb. 26, 2019, 14 pages.

Kim et al., "New Power Saving Algorithm Considering Associated STAs and Consecutive Traffics in WLAN AP," Proceedings of the 7th International Conference on Ubiquitous Information Management and Communication, ICUIMC 13, Jan. 1, 2013, 5 pages.

United States Patent and Trademark Office, "Notice of Allowance and Fee(s) Due," issued in connection with U.S. Appl. No. 15/720,094, dated Jan. 29, 2019, 7 pages.

European Patent Office, "Communication pursuant to Article 94(3) EPC," issued in connection with Application No. 18191352.6, dated Jan. 15, 2021, 10 pages.

United States Patent and Trademark Office, "Non-Final Office Action," issued in connection with U.S. Appl. No. 16/384,276, dated Oct. 6, 2020, 15 pages.

United States Patent and Trademark Office, "Final Office Action," issued in connection with U.S. Appl. No. 16/384,276, dated Feb. 3, 2021, 18 pages.

United States Patent and Trademark Office, "Notice of Allowance and Fee(s) Due," issued in connection with U.S. Appl. No. 16/384,276, dated Aug. 6, 2021, 9 pages.

United States Patent and Trademark Office, "Corrected Notice of Allowability," issued in connection with U.S. Appl. No. 16/384,276, dated Aug. 19, 2021, 3 pages.

United States Patent and Trademark Office, "Corrected Notice of Allowability," issued in connection with U.S. Appl. No. 15/720,094, dated Apr. 2, 2019, 2 pages.

European Patent Office, "Communication pursuant to Article 94(3) EPC," issued in connection with Application No. 18191352.6, dated Mar. 16, 2022, 6 pages.

European Patent Office, "Communication pursuant to Article 94(3) EPC," issued in connection with Application No. 18191352.6, dated Nov. 16, 2022, 5 pages.

European Patent Office, "Intention to Grant," issued in connection with European Patent Application No. 18191352.6, dated Apr. 11, 2023, 77 pages.

* cited by examiner

CONNECTIVITY SERVICE LEVEL ORCHESTRATOR AND ARBITRATOR IN INTERNET OF THINGS (IOT) PLATFORMS

RELATED APPLICATIONS

This patent arises from a continuation of U.S. patent application Ser. No. 16/384,276 (now U.S. Pat. No. 11,202,228), which was filed on Apr. 15, 2019, which is a continuation of U.S. patent application Ser. No. 15/720,094 (now U.S. Pat. No. 10,306,513), which was filed on Sep. 29, 2017. U.S. patent application Ser. No. 16/384,276 and U.S. patent application Ser. No. 15/720,094 are hereby incorporated herein by reference in their entireties. Priority to U.S. Patent Application No. U.S. patent application Ser. No. 16/384,276 and U.S. patent application Ser. No. 15/720,094 is hereby claimed.

FIELD OF INVENTION

The field of invention relates generally to computer processor architecture, and, more specifically, to a connectivity service level orchestrator and arbitrator in Internet of Things (IoT) platforms.

BACKGROUND

Internet of Things (IoT) is driving the need for multiple wireless network interfaces of different radio technologies in IoT platforms. This is especially relevant for IoT gateway platforms that communicate with multiple sensors and IoT devices for data aggregation and processing and also for communication with the cloud. Existing IoT gateway platforms face a number of challenges.

One challenge faced by some existing IoT gateways is the need to support and dynamically switch among multiple radio technologies, such as Bluetooth®, Bluetooth® Low Energy ("BLE"), ZigBee®, WiFi, cellular 2G, 3G and 4G, and 5G in the near future. Sensors and IoT devices equipped with multiple radio technologies create the need for IoT gateways to switch between different radio interfaces during the communication with these devices.

Another challenge faced by some existing IoT gateways is the need to deal with diverse types of data for diverse types of applications with diverse requirements (e.g., mission critical applications, real-time applications, smart-metering, video surveillance, etc.), which requires adaptive choice of the connectivity type to the cloud to meet the applications requirements and Service Level Agreement (SLA) with Service Providers (SPs).

Yet another challenge faced by some existing IoT gateways is the need to deal with different data throughput requirements for each of various IoT devices and sensors (e.g., some sensors emit 3 bytes per second while video cameras can emit 2 Mbps), which creates the need for bandwidth usage arbitration for each chosen connectivity type in a cost efficient way.

Currently, there is no solution in IoT platforms that addresses the above shortcomings.

BRIEF DESCRIPTION OF THE DRAWINGS

The present invention is illustrated by way of example and not limitation in the figures of the accompanying drawings, in which like references indicate similar elements and in which:

FIG. 15 shown a block diagram of a system in accordance with one embodiment of the present invention;

FIG. 16 is a block diagram of a first more specific exemplary system in accordance with an embodiment of the present invention;

FIG. 17 is a block diagram of a second more specific exemplary system in accordance with an embodiment of the present invention;

FIG. 18 is a block diagram of a SoC in accordance with an embodiment of the present invention.

DETAILED DESCRIPTION

Figure 1:
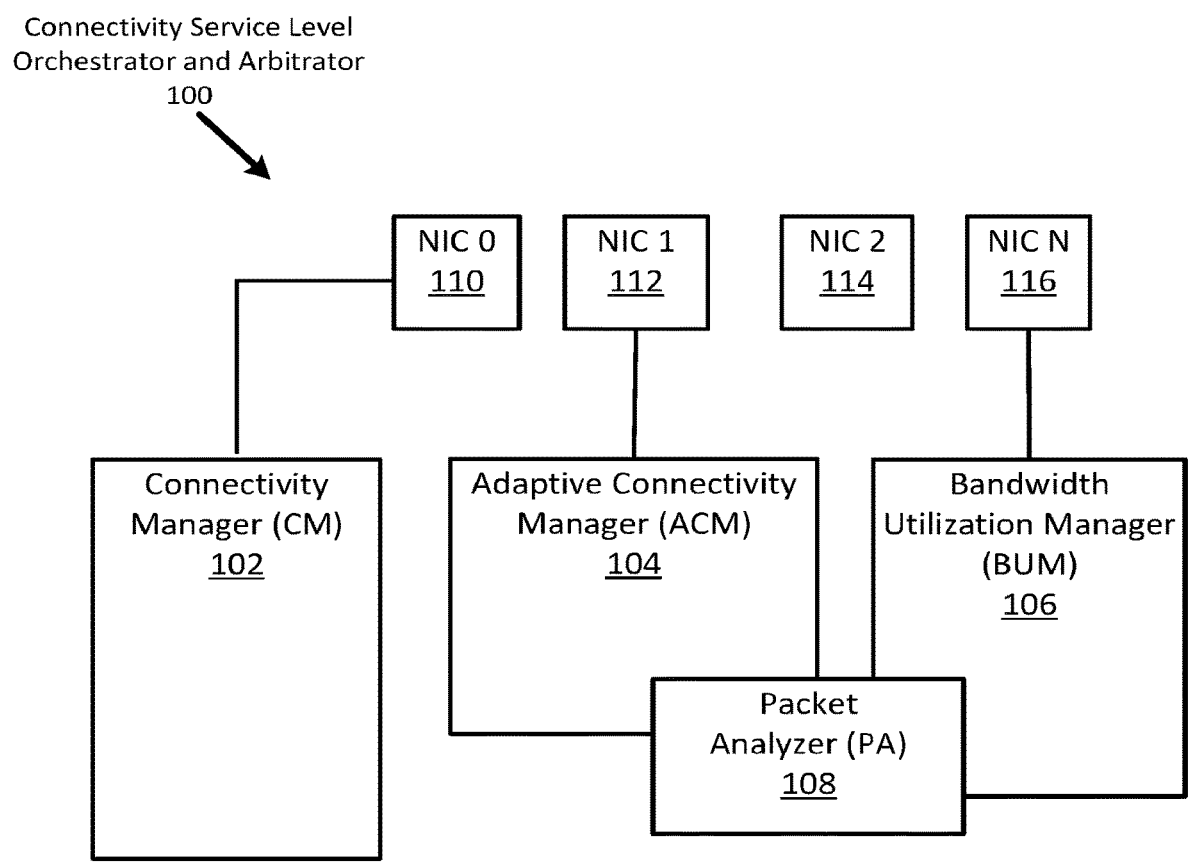
FIG. 1 is a block diagram illustrating processing components for use by a connectivity service level orchestrator and arbitrator, according to some embodiments.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments disclosed herein provide a connectivity manager for on-demand network interface activation, adaptive choice of connectivity and bandwidth usage arbitration in a transparent manner to the application and to the underlying operating system (OS). The connectivity manager is mainly a software agent that can be in a physical component (e.g., field-programmable gate array (FPGA), controller built in to an IoT platform device ("greenfield", described below) or added on to an IoT platform device ("brownfield", described below)), or can be implemented through a virtual machine in the IoT platform.

Disclosed embodiments improve on some existing platforms that contain an IoT gateway and multiple sensors and IoT devices equipped with multiple radio technologies, such as Bluetooth®, Bluetooth® Low Energy "BLE", ZigBee®, WiFi, cellular 2G, 3G and 4G, and 5G). A challenge arises when the presence of multiple radio technologies creates a need for the IoT gateway to switch between different radio interfaces during the communication with these sensors and devices. But some existing solutions suffer from requiring the user equipment or the IoT equipment to switch between radio technologies, rather than having the IoT gateway acting as an aggregator, as in some embodiments disclosed herein, dynamically switch between the radio technologies in a way that is transparent to the user equipment or IoT equipment.

Disclosed embodiments also improve on some existing platforms that contain an IoT gateway and multiple different types of applications, such as mission-critical applications, real-time applications, smart metering, video surveillance, etc., each of which uses a diverse type of data and has particular requirements as defined in a Service Level Agreement (SLA).

But some existing IoT gateways suffer from an inability to service the diverse applications having diverse data types and diverse SLAs. In some disclosed embodiments, a connectivity service level orchestrator and arbitrator provides a benefit of dynamically adapting to the particular data types and SLA requirements of diverse IoT devices and sensors.

Disclosed embodiments also improve on some existing platforms that contain multiple devices and multiple sensors, each with different data throughput requirements. For example, some sensors emit 3 bytes per second while video cameras can emit 2 Mbps. But some existing IoT gateways are not able to arbitrate bandwidth usage for each of the multiple different applications. In some disclosed embodiments, however, a connectivity service level orchestrator and arbitrator beneficially arbitrates among the bandwidth demands of multiple IoT devices and sensors, attempting to meet each of the SLA bandwidth requirements of each one.

IoT Communities

Disclosed embodiments enable IoT communities containing myriad IoT functional entities having diverse capabilities and diverse SLA requirements. An IoT functional entity can consist of networked software, hardware, or any combination thereof. An IoT functional entity can be a personal computer, a mobile computing device, a cell phone, or any similar device. An IoT functional entity need not necessarily contain a CPU, for example remotely-connected sensor devices can be IoT functional entities. As used herein, an IoT community can be referred to as any of an IoT platform, an edge system, a fog system, etc. As used herein, an IoT functional entity can be referred to as any of an IoT functional unit, an IoT device, an IoT module, a fog device, an edge device, etc. In the context of an IoT community, an IoT functional entity can be referred to as any of a member, a citizen, a constituent, a participant, etc.

An IoT community can be as simple as containing a single member, such as an IoT functional entity consisting of a personal computer. An IoT community can consist of multiple citizens, for example, multiple virtual machines hosted on a computer and managed by a hypervisor. An IoT community can consist of multiple constituents, for example, multiple containers running on a container environment and using a container technology, such as Docker® or Ansible®. An IoT community can consist of tens, hundreds, or thousands of such members, citizens, and constituents, each with different processing power and different SLA requirements.

Embodiments disclosed herein support IoT communities having (i) a plethora of IoT functional entities using different radio technologies for communication, (ii) diverse applications requirements and SLA requirements, (iii) different types of data having different throughput and hence different bandwidth needs for communication with the cloud, and (iv) cost-efficient communication with cloud without sacrificing SLAs.

Some IoT functional entities have software that allows them to be self-aware (understanding the functions they are to perform and their SLA requirements), and ambient (recognizing and maintaining contact with fellow community members and participating in community-wide interactions). Some disclosed embodiments enable such an IoT community containing such self-aware, ambient IoT functional entities that cooperate to perform their individual functions in compliance with their SLA requirements.

Some embodiments introduce a solution in IoT platforms (e.g., IoT gateways, or any edge device having direct communication with sensors and IoT devices and a communication with the cloud) providing connectivity management for on-demand network interface activation, adaptive choice of connectivity and bandwidth usage arbitration and cost efficiency.

FIG. 1 gives an overview of the solution, which aims to be transparent to the application and the underlying OS, and which supports an IoT community of constituent IoT functional entitles, according to some embodiments.

FIG. 1 is a block diagram illustrating processing components for use by a connectivity service level orchestrator and arbitrator, according to some embodiments. As shown, connectivity service level orchestrator and arbitrator 100 includes connectivity manager (CM) 202, adaptive connectivity manager (ACM) 104, bandwidth utilization manager (BUM) 106, and packet analyzer (PA) 108. In some embodiments, the modules 102-108 are implemented as software agents in a physical component (e.g., FPGA, controller (MCU) built in to an IoT platform device ("greenfield"

device) or added on to an IoT platform device ("brownfield" device)), or through a virtual machine in the IoT platform.

As used herein, a SLA (Service Level Agreement) is an agreement between a service provider (either internal or external) and an owner of one or more IoT devices or sensors. The SLA defines the level of service expected from the service provider by the IoT device or sensor or service end-consumer "user." SLAs are output-based in that their purpose is to define what the customer will receive. SLAs do not define how the service itself is provided or delivered. The SLA an Internet Service Provider (ISP) will provide its customers is a basic example of an SLA from an external service provider. In some embodiments, the metrics that define required levels of service include one or more of a minimum bandwidth required, a maximum latency required, and a minimum uptime requirement, such as mean time between network failures, to name a few.

In some embodiments, each IoT functional entity or sensor is assigned an SLA when initializing the system. In some embodiments, SLA requirements, at least in part, are included in headers or payloads of network packets or application packets (to distinguish between services SLAs: e.g., in a smart home system, temperature reading upload to Cloud will not have the same SLA as fire alarm upload to the Cloud.). In some embodiments, an individual IoT device or sensor can request an updated SLA to the connectivity service level orchestrator and arbitrator 100.

Connectivity Manager (CM 102)

The CM 102 enables an IoT functional entity, for example an edge device, to switch between different network interfaces on-demand as a function of the transmission activity of the sensors/devices attached to the edge device and the type of attachment (e.g., Bluetooth®, WiFi, Ethernet, etc.). The action can be initiated via policies and is bi-directional per the configuration. The IoT functional entity can initiate the connectivity based on data availability and readiness and/or the remote system can initiate a request based on timers or other policy based controls.

In some embodiments, as further detailed below, when an IoT functional entity's SLA calls for more bandwidth, based for instance on a high volume of data that needs to be transmitted or received, CM 102 switches to a higher bandwidth interface, such as from a Bluetooth® interface to a WiFi interface, the latter providing an order of magnitude higher bandwidth. In some embodiments, as also further detailed below, CM 102 attempts to satisfy the SLA bandwidth and latency requirements by switching to a different protocol, for example from a 2G wireless protocol to a 4G wireless protocol. In some embodiments, as also further detailed below, CM 102 attempts to satisfy SLA bandwidth and latency requirements by using multiple interfaces simultaneously, the resulting redundant packets to be discarded.

In some embodiments, all network interfaces 110-116 are in low power mode and in an idle state. Then, one or more interfaces turn to active state upon packet reception.

In some embodiments, CM 102 continuously monitors the network interfaces' status and monitors the reception of data by each active network interface. For example, when an active interface receives no data for a threshold amount of time, CM 102 sends a signal to this interface to put it in low power mode.

Adaptive Connectivity Manager (ACM 104)

In some embodiments, the adaptive connectivity manager (ACM) 104 attempts to provide the best choice of connectivity across the different network interfaces used by IoT functional entity citizens of the IoT community in an adaptive way. This includes the use of local transmission mechanisms such as BLE or ZigBee® for the first hop, to match the SLA. In some embodiments, at least part of the SLA is detailed in packet headers. In some embodiments, at least part of the SLA is detailed in packet payloads The adaptive connectivity manager (ACM) 104 attempts to establish the optimal choice of connectivity across the different network interfaces so as to satisfy SLA requirements of various IoT functional entities in the IoT community. ACM 104 can implement a deterministic control algorithm or a probabilistic control algorithm, depending on the SLA requirements of IoT community's constituent IoT functional entities.

For example, in the case of an industrial IoT community, such as a nuclear power plant having multiple remote sensors and shut-off valves, ACM 104 attempts to control and tightly manage the behavior of every single IoT functional entity. Failing to shut off a valve is not acceptable. Such IoT functional entities adhere to SLAs with stringent connectivity requirements.

Alternately, in some embodiments, ACM 104 applies a probabilistic approach to attempt to satisfy service-level requirements. For example, when the IoT functional entities are distributed temperature and barometric pressure sensors in an IoT community consisting of hundreds of such IoT weather sensing functional entities, the SLA requirements may tolerate a dropped connection here or there, and a probabilistic control algorithm will suffice. In such an IoT community, a fault occurring in a given IoT functional entity need not halt the continuing progress of its peer IoT functional entities. In some embodiments, ACM 104 attempts to satisfy one or more SLA requirements to within a predefined range. For example, if a business office is required to maintain a temperature of 74 degrees, ACM 104 will consider the SLA to be met whenever the temperature is within plus or minus one degree of the target.

In some embodiments, ACM 104 attempts to provide an optimal hop-by-hop routing decision by analyzing the received data from IoT functional entities. In some embodiments, ACM 104 engages in deep packet inspection (DPI) to examine the data portion, and in some cases parts of one or more headers, of each received data packet to determine which network interface to use to transmit the packet. For example, ACM 104 may attempt to optimize power and performance by selecting a ZigBee® network interface, expected to be low-cost and low-power, to transmit data streams comprising non-real-time data. In some embodiments, ACM 104 examines metadata incorporated in each received packet to decide which network interface to use to relay the packet.

In some embodiments, ACM 104 selects a data transmission path in an adaptive way to meet a Service Level Agreement associated with a data stream. For example, ACM 104 may relay a same data packet along a multi-hop path having variant network interfaces along the path, in order to ensure that at least one of the paths meets the latency required by the SLA. To eliminate the reception duplication due to the other copies of the data packet transmitted simultaneously, the receiver node examines the packet ID and drops duplicate packets (the packet ID is a part of the metadata included in each packet).

In some embodiments, ACM 104 transmits a same data packet through multiple network interfaces simultaneously, in order to ensure that at least one interface allows data to arrive on time, as specified in the SLA. To eliminate the reception duplication due to the other copies of the data packet transmitted simultaneously, the receiver node examines the packet ID and drops duplicate packets (the packet ID is a part of the metadata included in each packet).

In some embodiments, when selecting transmission paths in an adaptive way, ACM 104 uses the Sequenced Packet Protocol (SPP) to ensure correct reception of the entire message with the right sequence by the recipient. SPP is a byte stream protocol that can be used to provide reliable, flow-controlled, two-way transmission of data.

In some embodiments, ACM 104 adaptively selects a transmission path for data packets of a mission-critical and time-sensitive application by harvesting any available interfaces and network resources. To meet the mission-critical timing requirements, ACM 104 in some embodiments uses a Time Sensitive Network (TSN) if it exists. TSN can be a default interface of choice for a special category of services (e.g., remote surgery in an eHealth application). A Time-Sensitive Network is a set of IEEE 802 Ethernet substandards that are defined by the IEEE TSN task group. These standards enable deterministic real-time communication over Ethernet. In some embodiments, ACM 104 attempts to meet SLA requirements by simultaneously using LTE or 5G, even if WiFi exists, to guarantee reliability.

Bandwidth Utilization Manager (BUM 106)

Bandwidth utilization manager (BUM) 106 adapts the bandwidth utilization to attempt to meet one or more of several criteria such as cost of the network (data plan restriction for example), exact throughput required, real-time requirement, power consumption constraint, etc. BUM 106 analyzes the received data from sensors (through DPI, for example, or from metadata incorporated in each received packet).

Based on the inspection results, BUM 106 can take one or more of several actions:

In one embodiment, if the data does not show real-time service need and there is no real-time SLA and the only available connectivity is cellular w/limited data plan, then BUM 106 causes the data to be buffered for delayed transmission in less peak/low cost hours (e.g., mid-night) or until the reception of more data to be transmitted in one aggregates transmission.

In one embodiment, if the data packets are small, such as a few kilobytes, and the available network interfaces are broadband, then BUM 106 causes a dedicated bandwidth to be used for the data, with the dedicated bandwidth being limited to the data size. To do so, BUM 106 applies instantaneous bandwidth throttling techniques.

In one embodiment, if several data packets are received by an edge device simultaneously from multiple sensors and through different network interfaces (e.g., Bluetooth®, WiFi, ZigBee®) for transmission to the cloud through a cellular interface, BUM 106 causes all packets to be sent to the cloud simultaneously on the cellular interface while complying with the SLA. This can take place through allocating dedicated bandwidth to each packet (bandwidth split).

In some embodiments, as further detailed below, BUM 106 attempts to meet the SLA bandwidth requirements for a given device by borrowing bandwidth from at least one peer device. In some embodiments, as further detailed below, BUM 106 attempts to satisfy SLA bandwidth requirements for a given device or sensor by throttling at least one peer device.

Implementing the CM, ACM, and BUM

CM 102, ACM 104, and BUM 106 in some embodiments exist together in one edge device. In some embodiments, any of CM 102, ACM 104, and BUM 106 exist in as standalone devices. The choice of how to implement the components depends on the intelligence level desired and the capacity of each edge device.

In some embodiments, ACM 104 and BUM 106 exist in one device, and PA 108 is a separate module serving both modules. In other embodiments, ACM 104 and BUM 106 each has its own integrated packet analyzer module.

In some embodiments, if all three of CM 102, ACM 104, and BUM 106 exist simultaneously in one device, and they function in a coordinated way as follows: (i) CM 102 is the first module triggering the connectivity management status upon reception of packets, (ii) ACM 104 decides on the transmission interface, and (iii) BUM 106 performs the arbitration of the transmission interface.

Figure 2:
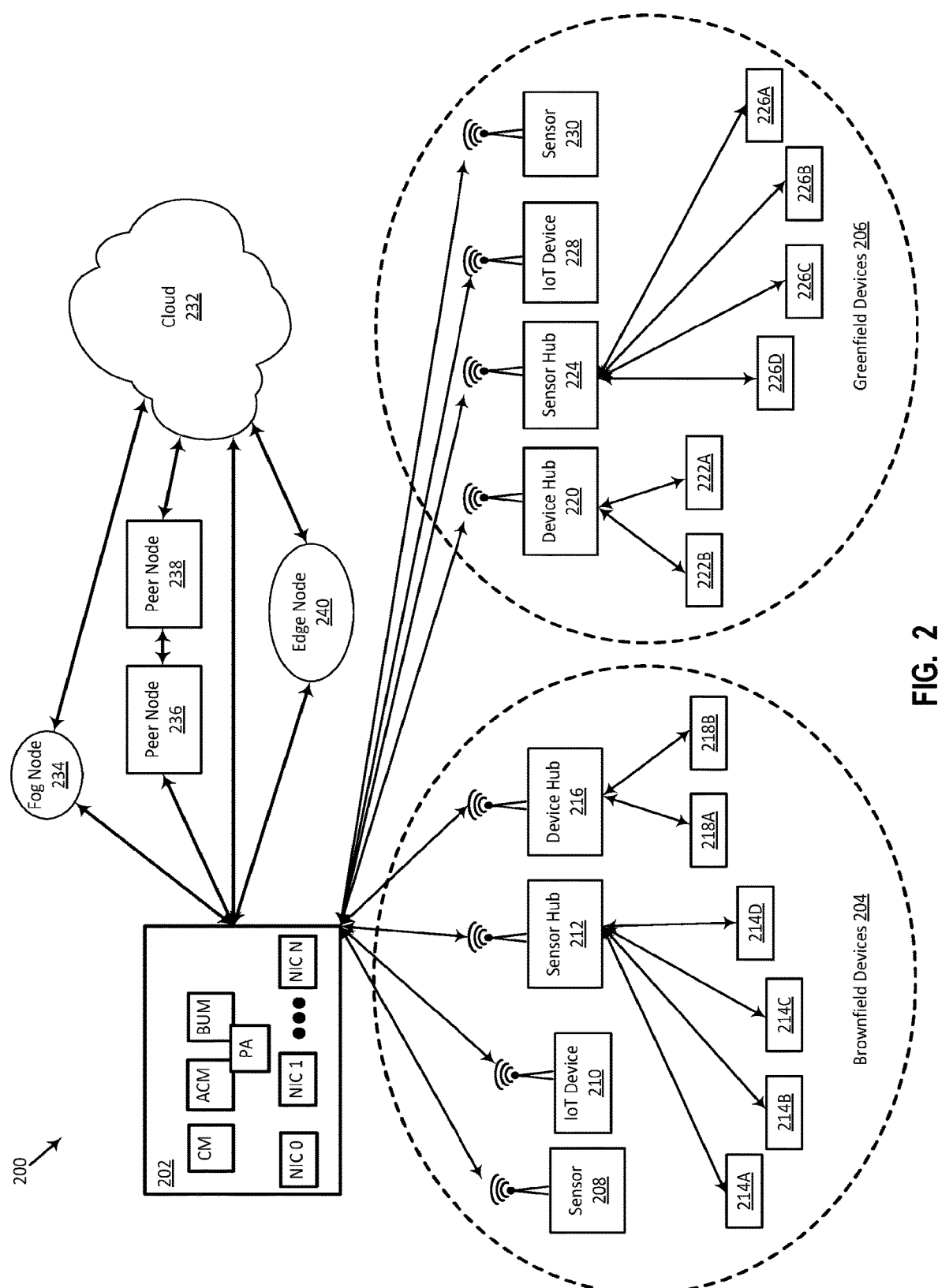
FIG. 2 is a block diagram illustrating an IoT community using a connectivity service level orchestrator and arbitrator, according to some embodiments.

FIG. 2 is a block diagram illustrating an IoT community using a connectivity service level orchestrator and arbitrator, according to some embodiments. As shown, IoT community 200 includes brownfield devices 204, which include several IoT functional entities: sensor 208, IoT device 210 and hubs 214A-214D, and device hub 216 and IoT devices 218A-218B. IoT community 200 also includes greenfield devices 206, which include several IoT functional entities: device hub 220 and IoT devices 222A-222B, sensor hub 224 and sensors 226A-226D, IoT device 228, and sensor 230. Brownfield devices 204 and greenfield devices 206 are illustrated with a dashed region, which is just an abstract indication of their grouping; the dashed lines do not represent any physical placement or relationship; IoT functional entities 208-230 may be disposed any distance from each other, without limitation.

As shown, connectivity service level orchestrator and arbitrator 202 connects to cloud 232 via any one of four paths: through fog node 234, through edge node 240, via a multi-hop path through peer node 236 and peer node 238, or directly. In operation, connectivity service level orchestrator and arbitrator 202 can select any of the four paths to exchange data with cloud 232, depending on which path best fits the SLA cost and performance of its constituent IoT functional entities. For example, the multi-hop path through peer nodes 236 and 238 may be used instead of (or in addition to) a direct connection due to cost considerations. For example, the direct connection to may offer better performance and thus be selected instead of a path through fog node 234.

As used herein, "brownfield" describes the billions of existing devices and legacy software applications performing discrete functions in isolation. In some embodiments, connectivity service level orchestrator and arbitrator 202 is external to, and connects wirelessly with brownfield devices 204.

In some embodiments, a brownfield device includes a processor, a memory, a network interface, and a non-transitory computer readable medium including instructions that, when loaded and executed by the processor, cause the brownfield device to interact with connectivity service level orchestrator and arbitrator 202 according to embodiments disclosed herein.

In some embodiments, a brownfield device, such as a thermostat or a washing machine, can be electronically controlled but lacks networking capabilities. In such cases the brownfield device can be coupled to a hardware device that includes processing circuitry and a network interface, and enables the brownfield device to communicate with and be controlled by connectivity service level orchestrator and arbitrator 202 according to embodiments disclosed herein.

"Greenfield," on the other hand, describes devices built from the ground up to take advantage of IoT. In some embodiments, connectivity service level orchestrator and arbitrator 202 is external to greenfield devices 206, which connect wirelessly with the connectivity service level orchestrator and arbitrator 202. In some embodiments, greenfield devices include at least part of the circuitry of connectivity service level orchestrator and arbitrator 202, such as a packet analyzer.

Figure 3:
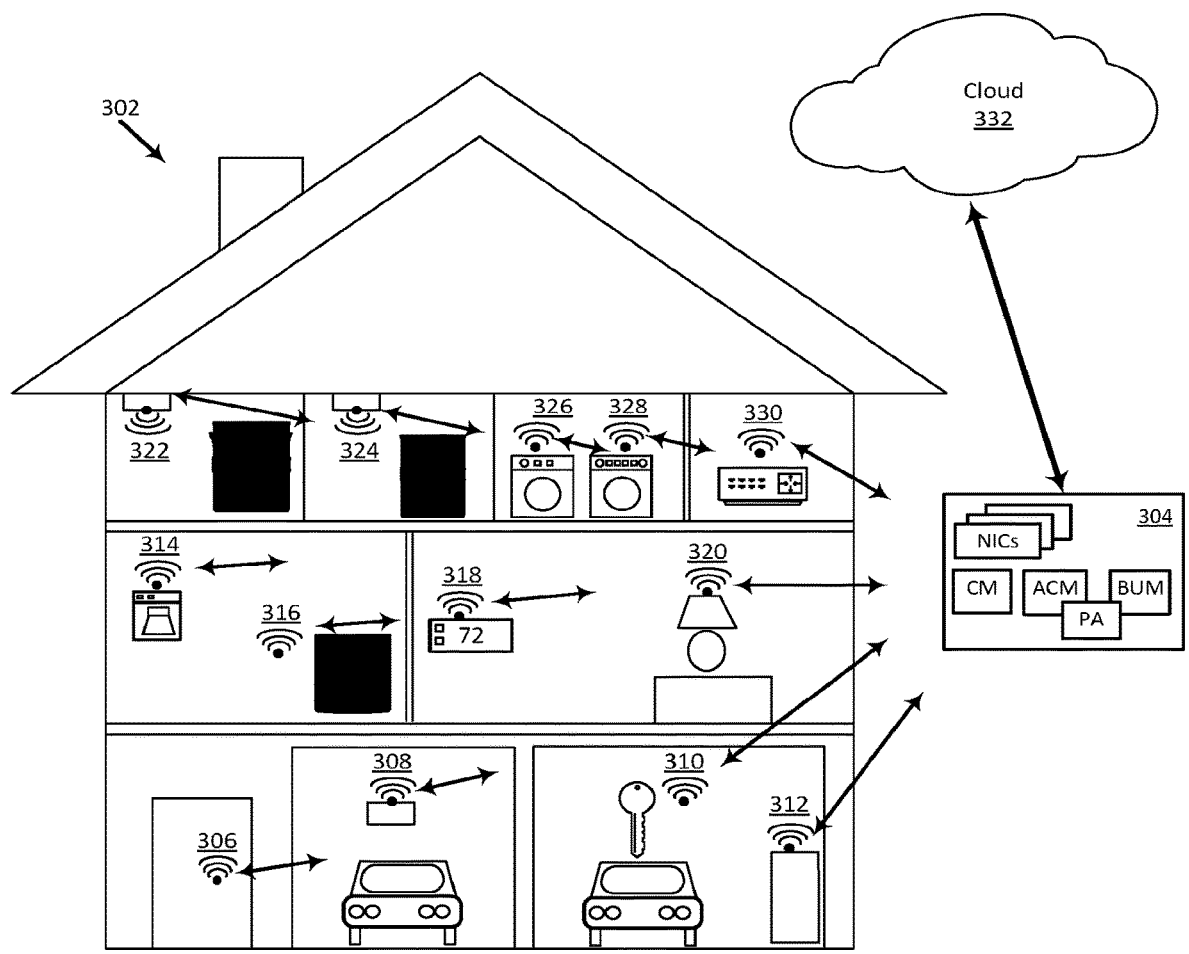
FIG. 3 is a block diagram illustrating an IoT community using a connectivity service level orchestrator and arbitrator, according to some embodiments.

FIG. 3 is a block diagram illustrating an IoT community using a connectivity service level orchestrator and arbitrator, according to some embodiments. The IoT community here is an exemplary residence 302, which is shown to include IoT (wireless) functional entities 306-330. In operation, IoT (Wireless) functional entities 306-330 are to wirelessly connect with connectivity service level orchestrator and arbitrator 304, which is similar to the connectivity service level orchestrator and arbitrator discussed and illustrated with respect to FIG. 1. IoT (wireless) functional entities 306-330 are to communicate with connectivity service level orchestrator and arbitrator 304 using any one or more of the wireless technologies (sometimes referred to as wireless protocols) illustrated and discussed with respect to FIG. 6. In this way, the embodiment of FIG. 3 allows a user on a WAN, such as the cloud, to remotely control a local platform of IoT devices and to remote monitor a local platform of IoT sensors.

IoT platform 302 illustrates exemplary brownfield or greenfield devices coupled to connectivity service level orchestrator and arbitrator 304 and enabled to receive commands from the cloud, in some cases also providing acknowledgment or status back to the cloud. Some of IoT (wireless) functional entities are sensors to sense local physical or electrical phenomena, and to report the results to the cloud.

Physical Phenomena Sensors:

One class of IoT devices (IoT functional entities) and sensors supported by embodiments disclosed herein includes wireless sensors to detect physical phenomena, like light, heat, temperature, barometric pressure, pH level, altitude, location, radioactivity, carbon monoxide, carbon dioxide, and methane, to name but a few examples. FIG. 3 illustrates exemplary IoT physical phenomena sensors: water heater temperature sensor 312, bedroom smoke detector 322, and bedroom carbon monoxide detector 324. The disclosed connectivity service level orchestrator and arbitrator 304 in some embodiments collects wireless sensor data over a local area network (LAN) and transmits the wireless sensor data to the cloud 332, which includes the Internet or other wide area network (WAN). It should be understood that embodiments disclosed herein are not to limit the scope of the invention to any particular set of IoT functional entities.

Electrical/Acoustic Sensors:

Another class of IoT devices (IoT functional entities) supported by embodiments disclosed herein includes wireless sensors to detect electrical, electromagnetic, and or acoustic phenomena, such as wireless signal strength, radio signal strength, battery level, static current or voltage, to name but a few examples, and to communicate the detected phenomena to connectivity service level orchestrator and arbitrator 304, and, thus, to the cloud 332. FIG. 3 illustrates signal strength detector 330, which is to measure and provide one or more of a WiFi (IEEE 802.11) signal strength, a cellular spectrum signal strength (e.g., the 1900 cellular band using frequencies in the 1840-1990 range, and the PCS 800 MHz band using frequencies in the 824-894 range), a radio signal strength (e.g., amplitude modulated radio (AM) using 10 kHz bands in frequencies in the range 535-1605 kHz, and frequency modulated radio (FM) using frequencies in the range 88-108 MHz. It should be understood that embodiments disclosed herein are not to limit the scope of the invention to any particular set of IoT functional entities.

Control Devices:

Another class of IoT devices (IoT functional entities) supported by embodiments disclosed herein includes wireless controllers to receive commands from the cloud via connectivity service level orchestrator and arbitrator 304, and optionally to provide acknowledgement and/or status to the cloud via connectivity service level orchestrator and arbitrator 304. FIG. 3 illustrates wireless controllers 306 to unlock a front door, 308 to operate a garage door opener, 310 to remotely ignite a car, 314 to control a coffee maker, 316 to control a dishwasher, 318 to control a thermostat, 320 to control a lamp, and 326 and 328 to control a washer and dryer. In some embodiments, the controlled IoT device (wireless device) provides status and/or acknowledgment to connectivity service level orchestrator and arbitrator 304. In some embodiments, wirelessly controlled thermostat 318 communicates with connectivity service level orchestrator and arbitrator 304 to provide a current temperature as status and to provide acknowledgment upon receipt of a command. It should be understood that embodiments disclosed herein are not to limit the scope of the invention to any particular set of IoT devices (IoT functional entities).

Figure 4:
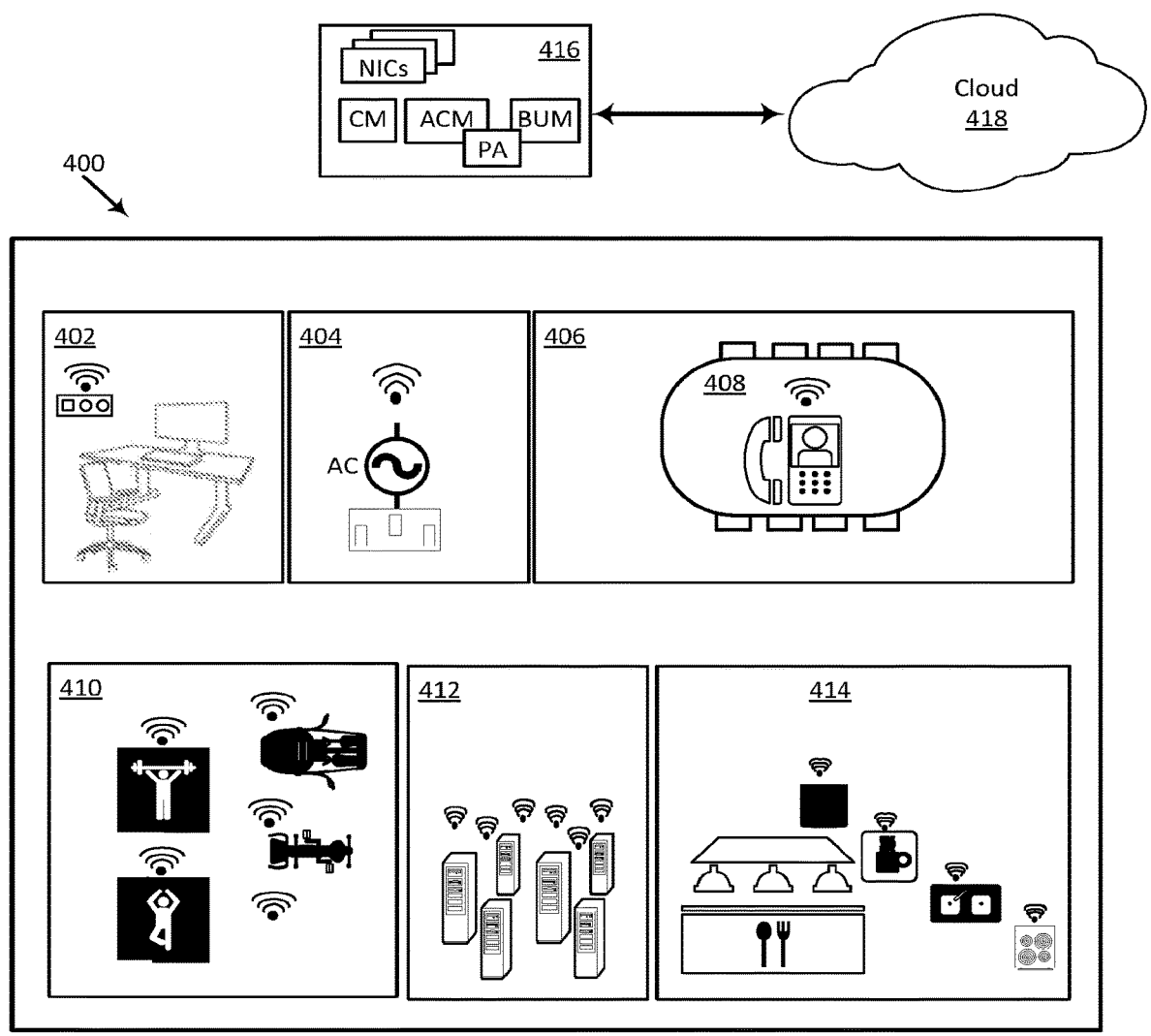
FIG. 4 is a block diagram illustrating an IoT community using a connectivity service level orchestrator and arbitrator, according to some embodiments.

FIG. 4 is a block diagram illustrating an IoT community using a connectivity service level orchestrator and arbitrator, according to some embodiments. The IoT community in the illustrated embodiment is an office building 400, which is an example of an IoT community, and which is shown to include IoT (wireless) devices 402-414, which, in operation, are to wirelessly, and locally connect with connectivity service level orchestrator and arbitrator 416, which includes the same components as discussed and illustrated with respect to FIG. 1. IoT (wireless) devices 402-414 are to communicate with connectivity service level orchestrator and arbitrator 416 using any of the wireless technologies (sometimes referred to herein as wireless protocols) illustrated and discussed with respect to FIG. 6.

As shown, IoT community 400 includes sensors to sense physical phenomena (e.g., motion sensor 402), sensors to sense electrical and acoustic phenomena (e.g., audio/video sensor 408 located in conference room 406, server farm health sensor 412), and IoT control devices (e.g., air conditioning control 404, controllers for exercise equipment in fitness center 410, and control of appliances in kitchen and cafeteria 414. In this way, the embodiment of FIG. 4 allows a remote operator on a WAN, such as cloud 418, to remotely control the local community of IoT devices and to remote monitor a local community of IoT sensors.

Figure 5:
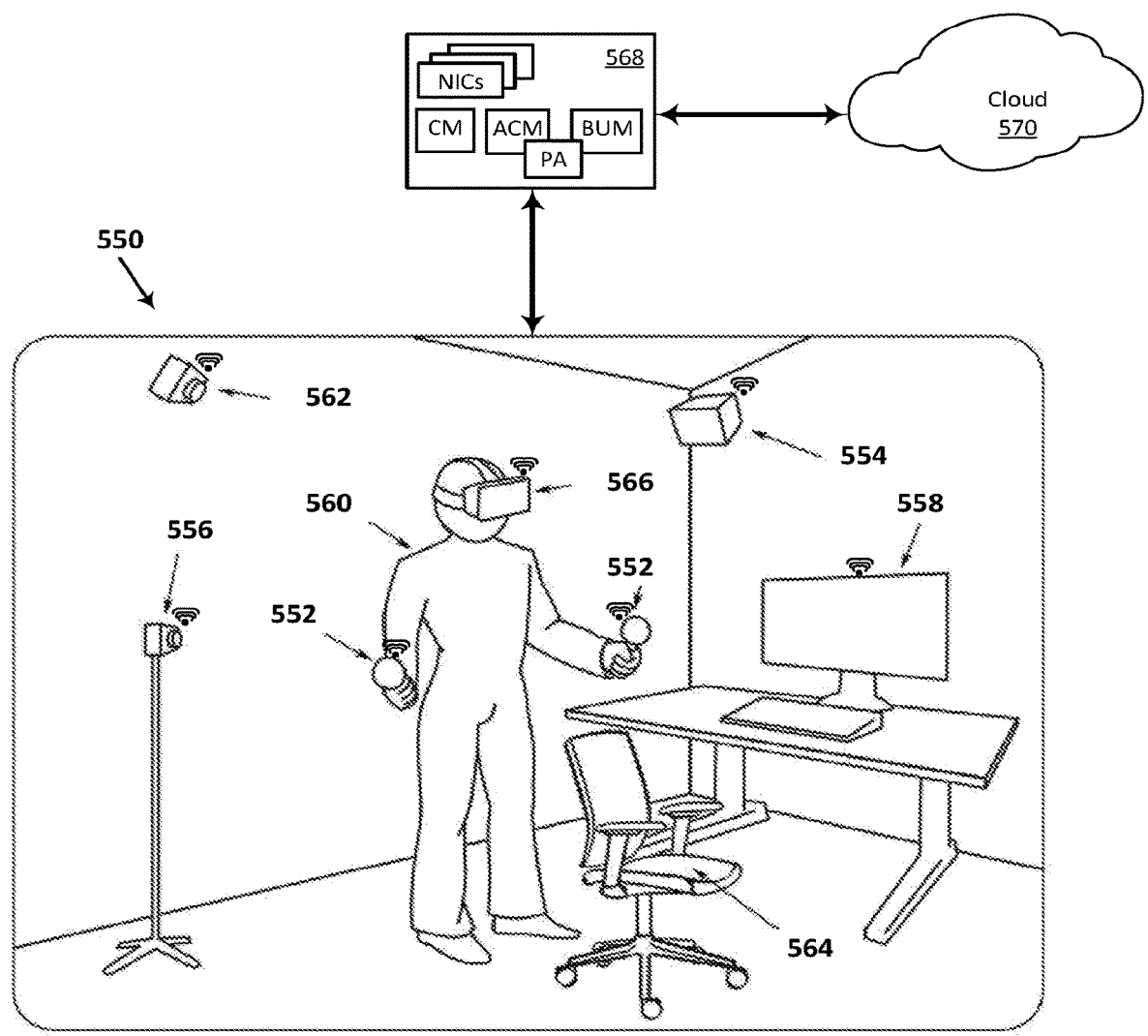
FIG. 5 is a block diagram illustrating an IoT community using a connectivity service level orchestrator and arbitrator, according to some embodiments.

FIG. 5 is a block diagram illustrating an IoT community utilizing a connectivity service level orchestrator and arbitrator, according to some embodiments. As shown, IoT community 550 is coupled to cloud 570 using connectivity service level orchestrator and arbitrator 568. As shown, IoT community 550 is a virtual reality environment including user 560, computer 558, chair 564, and multiple IoT devices and sensors, including virtual reality headset 566, hand-held input controllers 552, headset and controller tracking device 554, room camera 556, and body motion capture device 562.

The IoT community 550 illustrates an example of real-time requirements: remote players need to observe the user's position. The multi-player virtual world may get out of sync if real-time requirements are not satisfied. In some embodiments, users enter into a Service Level Agreement to pay to use IoT community 550, in return for which they are guaranteed a certain amount of bandwidth and/or latency.

In some embodiments, the IoT devices and sensors in IoT community 550 have various different SLA requirements, data requirements, and use different protocols and technologies. In some embodiments, each of the IoT devices and sensors (IoT functional entities) in IoT community 550 subscribes to a different SLA, which specifies bandwidth and latency requirements. In some embodiments, each of the IoT devices and sensors (IoT functional entities) in IoT community 550 uses a different communication protocol, for example one of the protocols illustrated and described with respect to FIG. 6. In some embodiments, each of the IoT devices and sensors (IoT functional entities) in IoT community 550 has a different data requirement; some devices, for example, need to transfer data in real time, while other devices may need to transfer mission critical data.

In some embodiments, connectivity service level orchestrator and arbitrator 568 dynamically connects the various IoT devices and sensors in IoT community 550 to the cloud 570 according to various different communication protocols, and arbitrates among the IoT devices and sensors to attempt to meet the various SLA bandwidth and latency requirements.

In some embodiments, connectivity service level orchestrator and arbitrator 568, in order to meet the bandwidth and latency requirements of a particular IoT device SLA, dynamically switches to a different radio or network technology. For example, in some embodiments, virtual reality headset 566 subscribes to a SLA specifying mission-critical real-time bandwidth and latency requirements, in order to avoid a lag in the visible motion that may tend to cause motion sickness. In some embodiments, connectivity service level orchestrator and arbitrator 568 can employ one or more strategies, as further described with respect to FIG. 8, in order to meet the SLA requirements of the virtual reality headset 566.

Figure 6:
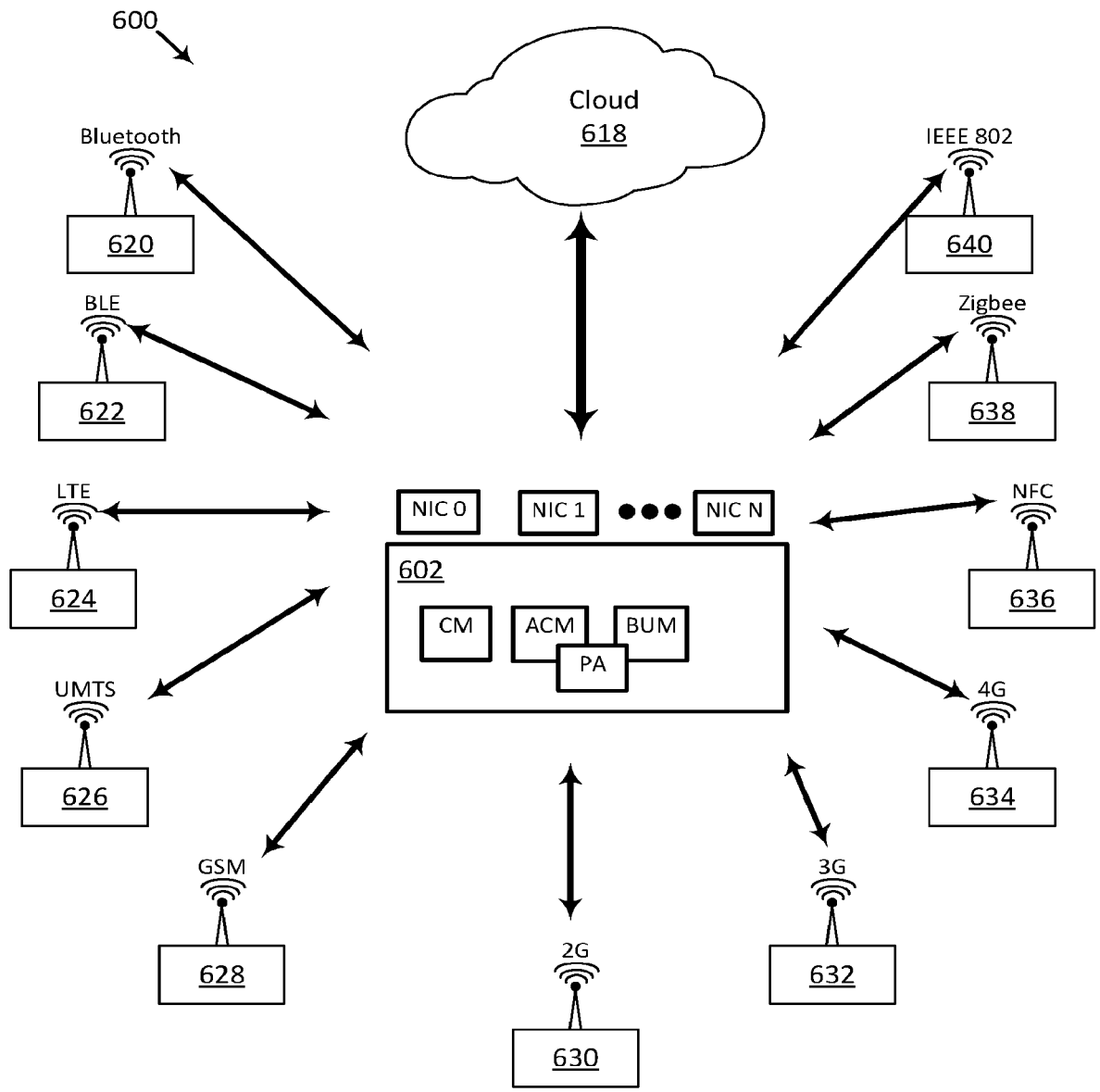
FIG. 6 is a block diagram illustrating wireless communication technologies supported by a connectivity service level orchestrator and arbitrator, according to some embodiments.

FIG. 6 is a block diagram illustrating wireless communication technologies supported by a connectivity service level orchestrator and arbitrator, according to some embodiments. As shown, IoT community 600 includes connectivity service level orchestrator and arbitrator 602, which includes the same components—NICs, CM, ACM, BUM, PA—as discussed and illustrated with respect to FIG. 1. As shown, wireless devices 620-640 include wireless communication capabilities according to various, different radio technologies, including Bluetooth® 620, Bluetooth® Low Energy (BLE) 622, Long Term Evolution (LTE) 624, Universal Mode Telecommunication Service (UMTS) 626, Global Method for Mobile Communications (GSM) 628, second generation wireless protocol (2G) 630, third generation wireless protocol (3G) 632, fourth generation wireless protocol (4G) 634, Near-Field-Communications (NFC) 636, ZigBee® 638, and protocols standardized by the Institute of Electrical and Electronics Engineers (IEEE) under IEEE 802 640. IEEE 802 protocols having relevance to wireless devices include at least IEEE 802.11, IEEE 802.16, and IEEE 802.18, to name a few. In operation, each of the IoT functional entities connects to cloud 618 through connectivity service level orchestrator and arbitrator 602. It is to be understood that the exemplary wireless communication protocols illustrated in FIG. 6 are meant for illustrative purposes only, and are not meant to limit the scope of the invention to any particular protocol or protocols. Having the ability to comply with a plethora of wireless technologies is beneficial because the disclosed connectivity service level orchestrator and arbitrator 602 can be used with a wide variety of IoT functional entities that use any of the wireless communication technologies disclosed in FIG. 6.

Figure 7:
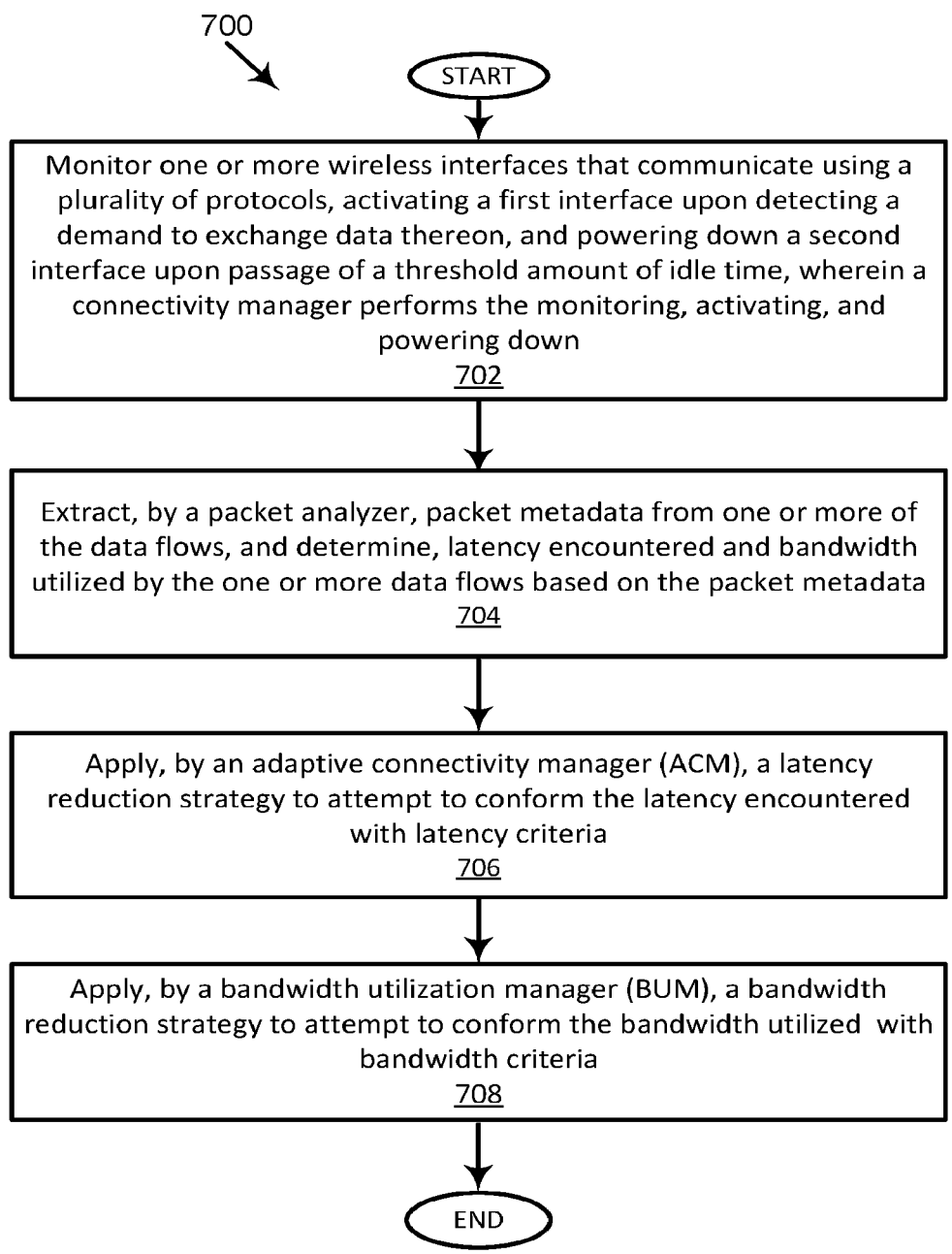
FIG. 7 is a flow diagram illustrating a process to be executed by a connectivity service level orchestrator and arbitrator, according to some embodiments.

FIG. 7 is a flow diagram illustrating a process to be executed by a connectivity service level orchestrator and arbitrator, according to some embodiments. Process 700 in some embodiments is to be executed by a virtual machine implementation of the connectivity service level orchestrator and arbitrator. For example, with reference to FIG. 1, connectivity manager 102, adaptive connectivity manager (ACM) 104, bandwidth utilization manager (BUM) 106, and packet analyzer 116 can each be implemented as a virtual machine and executed on a processor that supports virtual machines.

In other embodiments, process 700 is to be executed by an edge device, which, as used herein, refers to a device to connect a local area network (LAN) or personal area network (PAN) to a wide area network (WAN). In some embodiments, the LAN and PAN include multiple IoT functional entities, and the WAN includes the Internet. FIG. 4 illustrates an example of such a configuration, as the IoT community 400 represents a LAN, and the connection to the cloud 418 represents a WAN.

As shown, after starting process 700, at 702 a connectivity manager is to monitor one or more wireless interfaces that communicate using a plurality of protocols, activate a first interface upon detecting a demand to exchange data thereon, and power down a second interface upon passage of a threshold amount of idle time.

At 704, a packet analyzer is to extract packet metadata from one or more data flows, and determine, latency encountered and bandwidth utilized by the one or more data flows based on the packet metadata. In packet switching networks, and as used herein, a "data flow" is a sequence of data packets from a source device, such as from an IoT functional entity to a destination, such as a location on the cloud. A "data flow" as described in the disclosure may sometimes be referred to as a "traffic flow," or "packet flow," or "network flow." As used herein, "packet metadata" refers to information that describes the packet. Packet metadata is often included in each packet's header, and may include fields such as destination port, source port, header length, total length, protocol, checksum, and packet options. A timestamp stored in the packet header can be used to measure a packet's latency, for example by comparing the timestamp inserted by a packet source to the timestamp at the packet destination.

Figure 8:
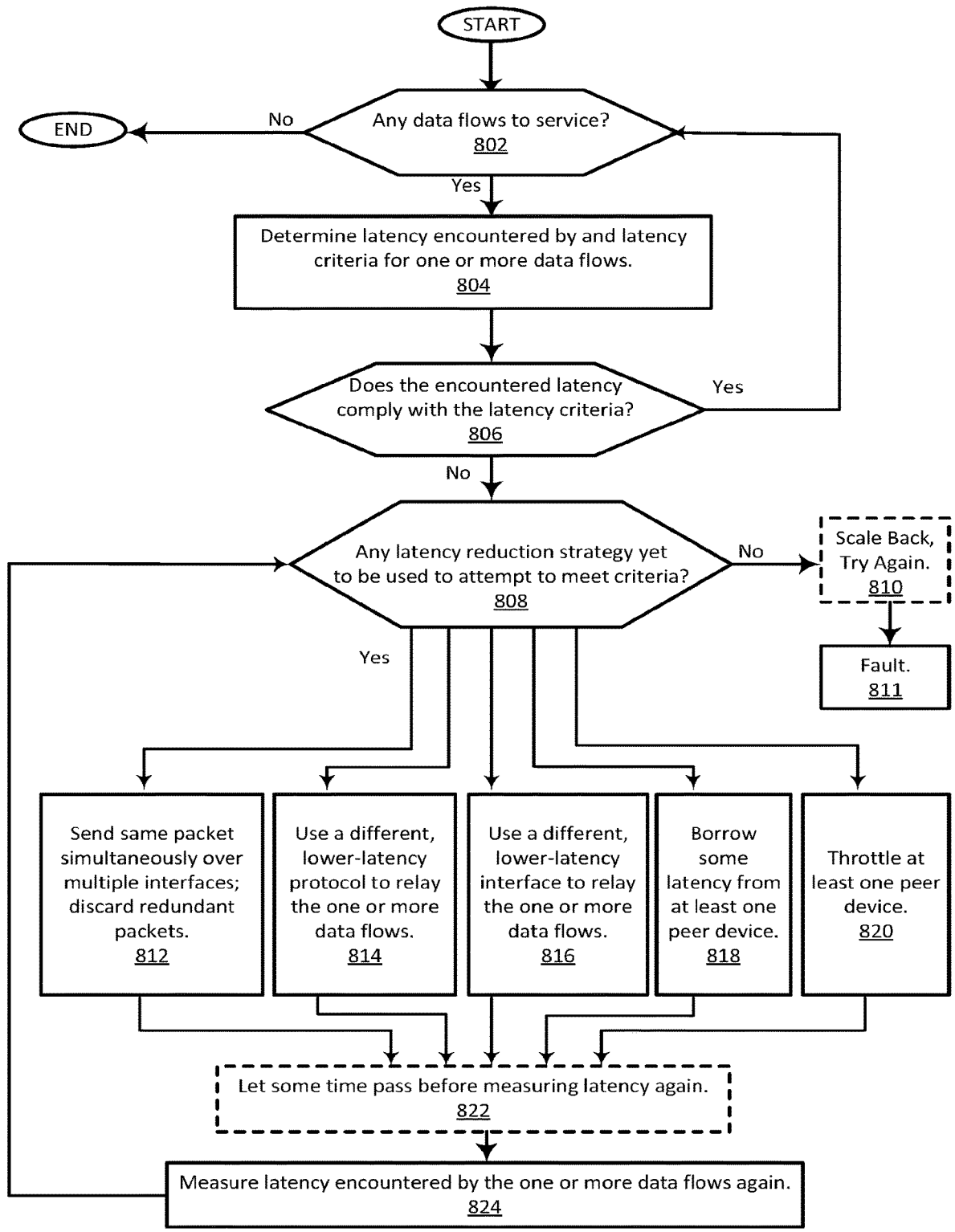
FIG. 8 is a flow diagram illustrating a process to be executed by an adaptive connectivity manager (ACM) of a connectivity service level orchestrator and arbitrator, according to some embodiments.

At 706, an adaptive connectivity manager (ACM) is to apply a latency reduction strategy to attempt to conform the latency encountered to latency criteria specified by the SLA of the associated IoT functional entity. In some embodiments, SLA latency requirements are included in packet metadata. In some embodiments, SLA latency requirements of IoT functional devices are stored in memory and accessed by the ACM. FIG. 8 and its associated description describe a process to be performed by the ACM, including application of latency reduction strategies, according to some embodiments.

Figure 9:
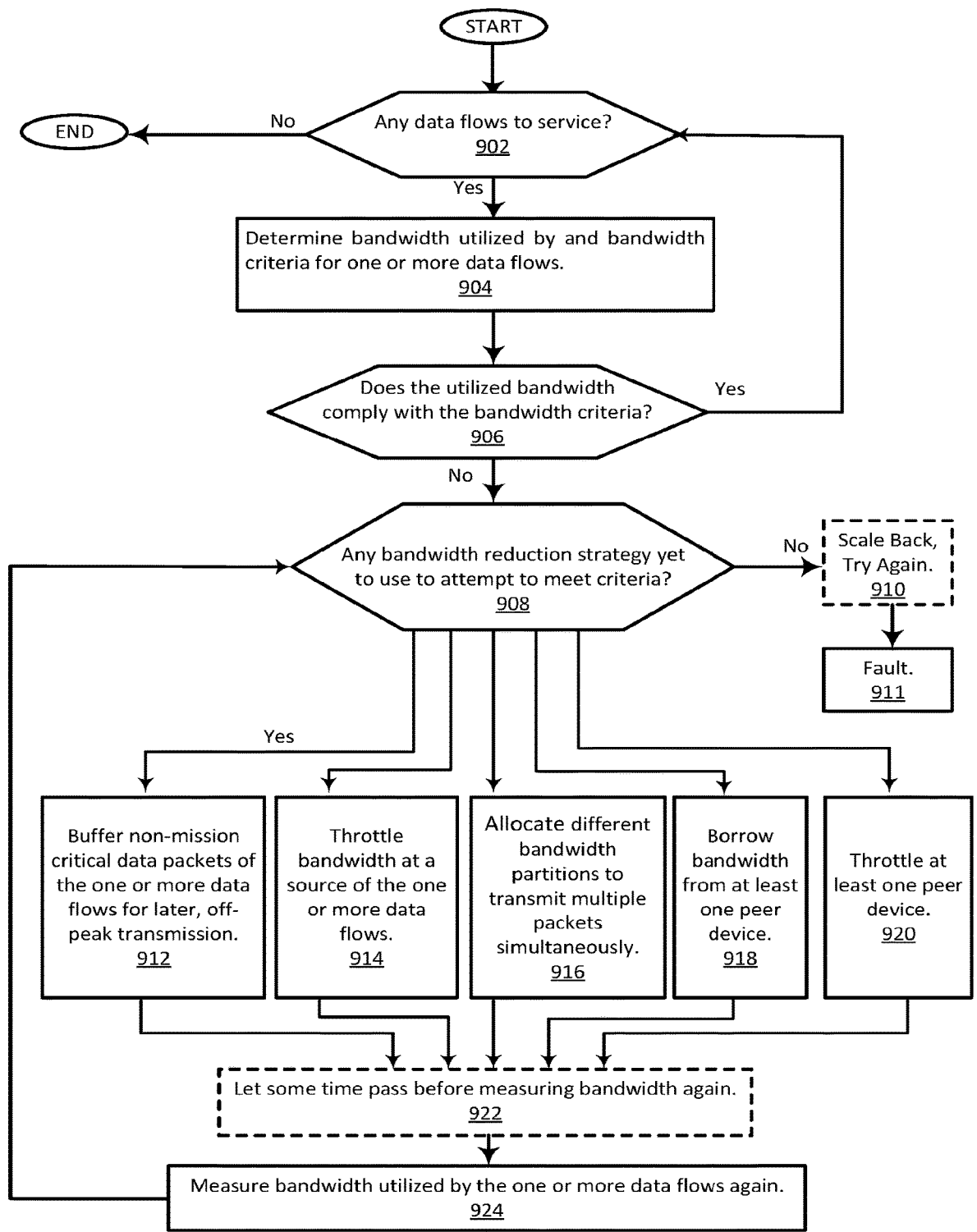
FIG. 9 is a flow diagram illustrating a process to be executed by a bandwidth utilization manager (BUM) of a connectivity service level orchestrator and arbitrator, according to some embodiments.

At 708, a bandwidth utilization manager (BUM) is to apply a bandwidth reduction strategy to attempt to conform the bandwidth utilized to bandwidth criteria specified by the SLA of the associated IoT functional entity. In some embodiments, SLA bandwidth requirements are included in packet metadata. In some embodiments, SLA bandwidth requirements of IoT functional devices are stored in memory and accessed by the ACM. FIG. 9 and its associated description describe a process to be performed by the BUM, including application of bandwidth reduction strategies, according to some embodiments.

FIG. 8 is a flow diagram illustrating a process to be executed by an adaptive connectivity manager of a connectivity service level orchestrator and arbitrator, according to some embodiments. As shown, after starting, at 802 the adaptive connectivity manager is to determine whether there are any flows yet to service. If not, the process ends. Otherwise, at 804 the adaptive connectivity manager is to determine latency encountered by and latency criteria for one or more data flows. At 806, the adaptive connectivity manager is to determine whether the encountered latency complies with the latency criteria. If so, the adaptive connectivity manager is to update counters and pointers (not shown) to move to the next flow, and the process returns to 802 to determine whether to service more data flows.

Otherwise, if it is determined at 806 that the latency criteria are not satisfied, at 808 the adaptive connectivity manager is to determine whether there is a latency reduction strategy yet to be used to attempt to meet the criteria. If not, a fault is generated at 811.

Optionally, before generating the fault, the adaptive connectivity manager at 810 is to scale back and try again. In order to scale back, in some embodiments, the adaptive connectivity manager is to loosen the latency criteria, for example by switching to a lower-cost and lower-performance service level agreement, and to return to 806. If the encountered latency still does not meet criteria after scaling back, a fault is generated at 810.

If it is determined at 808 that there is a latency-reduction strategy yet to be attempted, the illustrated embodiment includes five available latency reduction strategies to be tried, not necessarily in any particular order, described at 812, 814, 816, 818, and 820. Some embodiments provide more latency reduction strategies. Some embodiments provide fewer latency reduction strategies.

At 812, the adaptive connectivity manager is to send a same data packet simultaneously over multiple interfaces; and discard redundant packets. In this way, the fastest interface of the multiple interfaces is to be selected, potentially reducing the overall latency encountered by the data flow.

At 814, the adaptive connectivity manager is to use a different, lower-latency protocol to relay the one or more data flows. For example, the adaptive connectivity manager could use an IEEE 802.11, rather than a 3G, cellular protocol; IEEE 802.11 provides an order of magnitude greater bandwidth than 3G, and would be expected to also have a lower latency for a data flow. In this way, the data flow will utilize an interface expected to have lower latency, thereby potentially reducing the latency encountered by the data flow.

At 816, the adaptive connectivity manager is to use a different, lower-latency interface to relay the one or more data flow. In some embodiments, a different interface is to be selected empirically, by maintaining and analyzing data transfer rate statistics experienced by various interfaces, and selecting the fastest one.

At 818, the adaptive connectivity manager is to borrow some bandwidth from at least one peer device. In some embodiments, the adaptive connectivity manager assigns a ranking to each of the IoT devices, and IoT devices with higher rankings are given higher priority. In some embodiments, the adaptive connectivity manager attempts to meet the SLA bandwidth requirements of IoT devices with higher rankings, even if so doing sacrifices the SLA bandwidth requirements of lower-ranked IoT devices. In some embodiments, rather than to assign a specific ranking, each IoT devices is grouped into one of a plurality of tiers of service, and IoT devices in higher-ranked tiers are afforded higher shares of bandwidth than IoT devices in lower-ranked tiers.

At 820, the adaptive connectivity manager is to throttle at least one peer device. In some embodiments, for example, the adaptive connectivity manager throttles an IoT device in a lower-ranked tier to accommodate the SLA bandwidth requirements of a higher-ranked IoT device. In some embodiments, an IoT device broadcasts an SOS signal to indicate a need for more bandwidth or lower latency, to which the adaptive connectivity manager responds. In some embodiments, the adaptive connectivity manager asserts a DEAD_STOP signal to an IoT device or sensor, likely a lower-ranked one, to throttle or reduce the bandwidth utilized by that device or sensor.

At 822, the adaptive connectivity manager is optionally to let some time pass before measuring latency again. FIG. 8 uses a dashed outline to convey the optional nature of this action. At 824, the adaptive connectivity manager is to measure the latency encountered by the one or more data flows again. Then, the process is to return to 808 to determine whether the encountered latency complies with the latency criteria.

FIG. 9 is a flow diagram illustrating a process to be executed by a bandwidth utilization manager (BUM) of a connectivity service level orchestrator and arbitrator, according to some embodiments. As shown, after starting, at 902 the BUM is to determine whether there are any flows yet to service. If not, the process ends. Otherwise, at 904 the BUM is to determine bandwidth utilized by and bandwidth criteria for one or more data flows. At 906, the BUM is to determine whether the utilized bandwidth complies with the bandwidth criteria. If so, the BUM is to update counters and pointers (not shown) to move to the next flow, and the process returns to 902 to determine whether to service any more data flows.

Otherwise, if the bandwidth criteria are not satisfied, at 908 the BUM is to determine whether there is a bandwidth reduction strategy yet to be used to attempt to comply with the criteria. If not, a fault is generated at 911.

Optionally, before generating the fault, the BUM at 910 is to scale back and try again. In order to scale back, in some embodiments, the adaptive connectivity manager is to loosen the bandwidth criteria, for example by switching to a lower-cost and lower-performance service level agreement, and to return to 906. If the utilized bandwidth still does not meet criteria after scaling back, a fault is generated at 911.

If it is determined at 908 that there is a bandwidth-reduction strategy yet to be attempted, the illustrated embodiment includes five available bandwidth reduction strategies to be tried, not necessarily in any particular order, described at 912, 914, 916, 918, and 920. Some embodiments provide more bandwidth reduction strategies. Some embodiments provide fewer bandwidth reduction strategies, while other embodiments provide more bandwidth reduction strategies.

At 912, the BUM is to buffer non-mission critical data packets of the one or more data flows for later, off-peak transmission. In this way, the one or more data flows will not transmit data during peak hours, thereby potentially reducing the utilized bandwidth at peak hours.

At 914, the BUM is to throttle bandwidth of packets generated at a source of the one or more data flows. To throttle the bandwidth, in some embodiments, the BUM is to do so indirectly by refusing to accept data packets at greater than a threshold rate. In some embodiments, the source of the data flow will slow down a data rate in response to repeated non-acknowledge responses. In other embodiments, the BUM is to throttle bandwidth directly, by sending a message requesting a data rate reduction to the source of the data flow.

At 916, the BUM is to use a different, lower-bandwidth interface to relay the one or more data flow. In some embodiments, a different interface is to be selected empirically, by analyzing data transfer rates experienced by various interfaces, and selecting the fastest one.

At 918, the BUM is to borrow some bandwidth from at least one peer device. In some embodiments, the BUM assigns a ranking to each of the IoT devices, and gives higher priority to IoT devices with higher rankings. In some embodiments, the BUM attempts to meet the SLA bandwidth and latency requirements of IoT devices with higher rankings, even if so doing sacrifices the SLA bandwidth requirements of lower-ranked IoT devices. In some embodiments, rather than to assign a specific ranking, each IoT devices is grouped into one of a plurality of tiers of service, and IoT devices in higher-ranked tiers are afforded higher shares of bandwidth than IoT devices in lower-ranked tiers.

At 920, the BUM is to throttle at least one peer device. In some embodiments, for example, the BUM throttles an IoT device in a lower-ranked tier to accommodate the SLA bandwidth requirements of a higher-ranked IoT device. In some embodiments, an IoT device broadcasts an SOS signal to indicate a need for more bandwidth or lower latency, to which the BUM responds. In some embodiments, the BUM asserts a DEAD_STOP signal to an IoT device or sensor, likely a lower-ranked one, to throttle or reduce the bandwidth utilized by that device or sensor.

At 922, the BUM is optionally to let some time pass before measuring bandwidth again. FIG. 9 uses a dashed outline to convey the optional nature of this action. At 924, the BUM is to measure the bandwidth utilized by the one or more data flows again. Then, the process is to return to 908 to determine whether the utilized bandwidth complies with the bandwidth criteria.

Internet of Things

Figure 10:
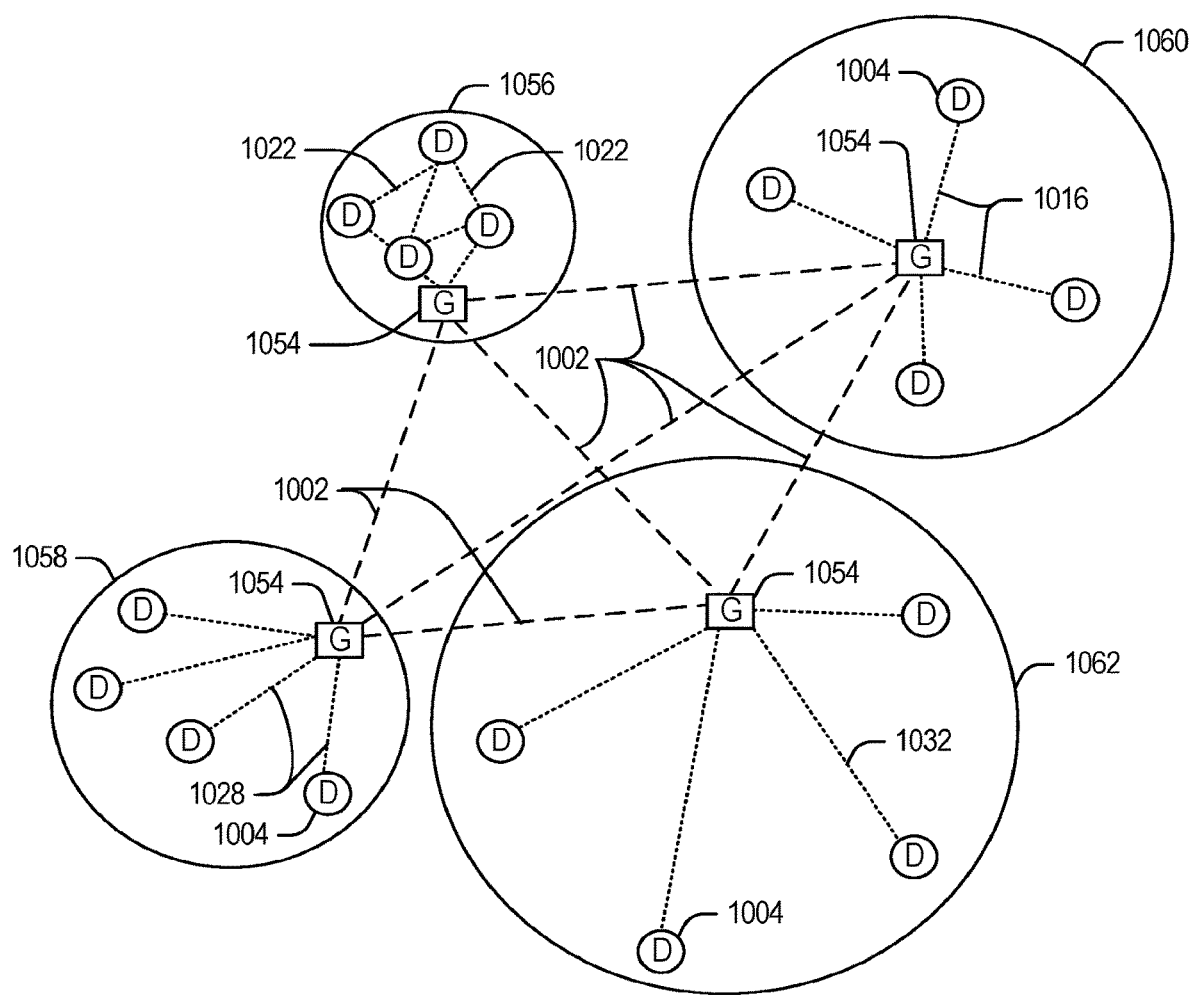
FIG. 10 illustrates a domain topology for respective internet-of-things (IoT) networks coupled through links to respective gateways, according to an example.

FIG. 10 illustrates an example domain topology for respective internet-of-things (IoT) networks coupled through links to respective gateways. The Internet of Things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or another larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 11:
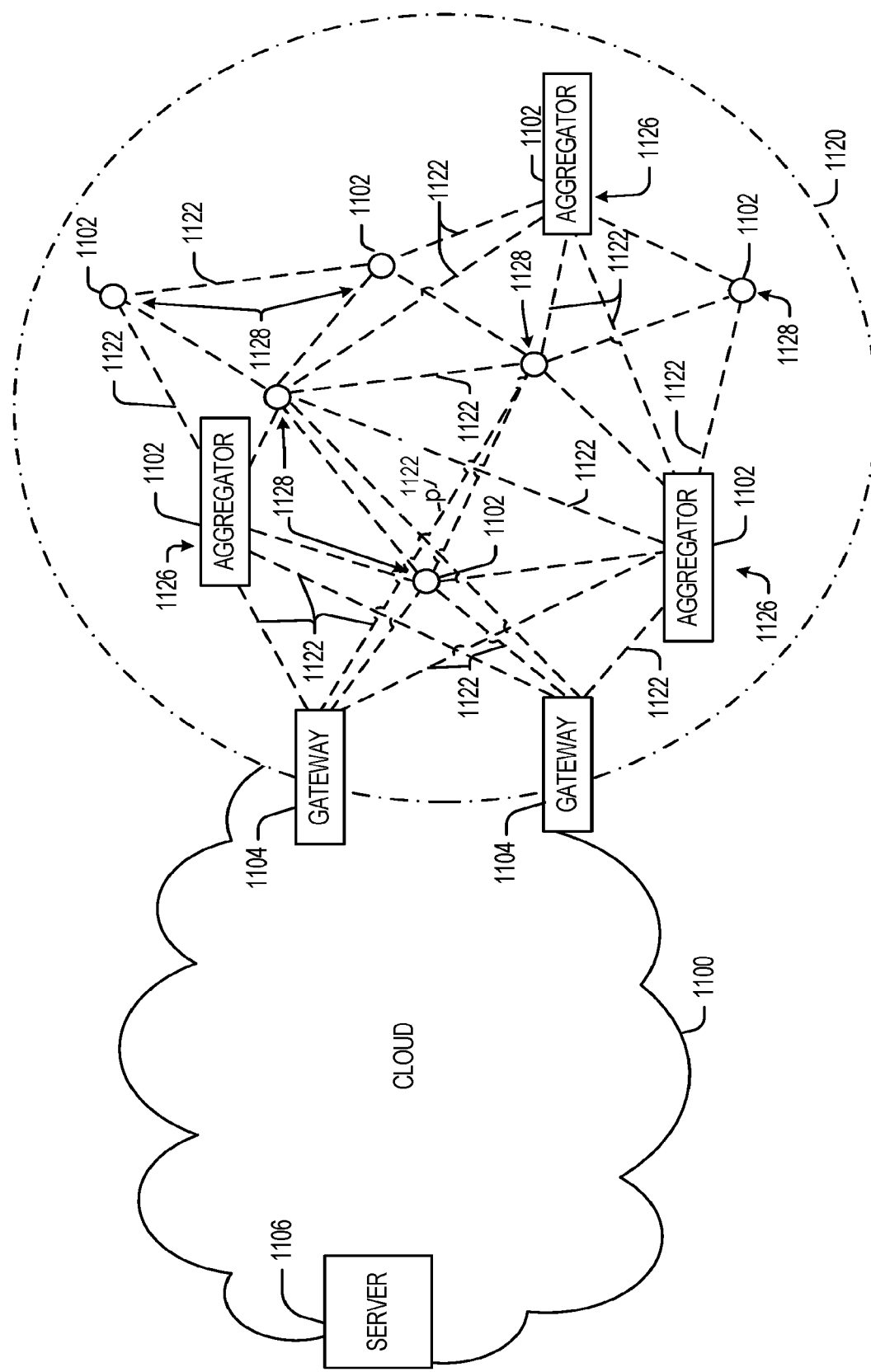
FIG. 11 illustrates a cloud computing network in communication with a mesh network of IoT devices operating as a fog device at the edge of the cloud computing network, according to an example.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 10 and 11, present a number of new challenges in a heterogeneous network of connectivity comprising a combination of wired and wireless technologies.

FIG. 10 specifically provides a simplified drawing of a domain topology that may be used for a number of internet-of-things (IoT) networks comprising IoT devices 1004, with the IoT networks 1056, 1058, 1060, 1062, coupled through backbone links 1002 to respective gateways 1054. For example, a number of IoT devices 1004 may communicate with a gateway 1054, and with each other through the gateway 1054. To simplify the drawing, not every IoT device 1004, or communications link (e.g., link 1016, 1022, 1028, or 1032) is labeled. The backbone links 1002 may include any number of wired or wireless technologies, including optical networks, and may be part of a local area network (LAN), a wide area network (WAN), or the Internet. Additionally, such communication links facilitate optical signal paths among both IoT devices 1004 and gateways 1054, including the use of MUXing/deMUXing components that facilitate interconnection of the various devices.

The network topology may include any number of types of IoT networks, such as a mesh network provided with the network 1056 using Bluetooth® Low Energy (BLE) links 1022. Other types of IoT networks that may be present include a wireless local area network (WLAN) network 1058 used to communicate with IoT devices 1004 through IEEE 802.11 (Wi-Fi) links 1028, a cellular network 1060 used to communicate with IoT devices 1004 through an LTE/LTE-A (4G) or 5G cellular network, and a low-power wide area (LPWA) network 1062, for example, a LPWA network compatible with the LoRaWAN specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 1004, such as over the backbone links 1002, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 1056, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 1058, for instance, may use systems that perform standards conversion to provide multi-standard connectivity, enabling IoT devices 1004 using different protocols to communicate. Further systems may provide seamless interconnectivity across a multi-standard infrastructure comprising visible Internet resources and hidden Internet resources.

Communications in the cellular network 1060, for instance, may be enhanced by systems that offload data, extend communications to more remote devices, or both. The LPWA network 1062 may include systems that perform non-Internet protocol (IP) to IP interconnections, addressing, and routing. Further, each of the IoT devices 1004 may include the appropriate transceiver for wide area communications with that device. Further, each IoT device 1004 may include other transceivers for communications using additional protocols and frequencies.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 11 below.

FIG. 11 illustrates a cloud computing network in communication with a mesh network of IoT devices (devices 1102) operating as a fog device at the edge of the cloud computing network. The mesh network of IoT devices may be termed a fog 1120, operating at the edge of the cloud 1100. To simplify the diagram, not every IoT device 1102 is labeled.

The fog 1120 may be considered to be a massively interconnected network wherein a number of IoT devices 1102 are in communications with each other, for example, by radio links 1122. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T-.M.A.N.) routing protocol, or the OMA Lightweight M2M (LWM2M) protocol, among others.

Three types of IoT devices 1102 are shown in this example, gateways 1104, data aggregators 1126, and sensors 1128, although any combinations of IoT devices 1102 and functionality may be used. The gateways 1104 may be edge devices that provide communications between the cloud 1100 and the fog 1120, and may also provide the backend process function for data obtained from sensors 1128, such as motion data, flow data, temperature data, and the like. The data aggregators 1126 may collect data from any number of the sensors 1128, and perform the back end processing function for the analysis. The results, raw data, or both may be passed along to the cloud 1100 through the gateways 1104. The sensors 1128 may be full IoT devices 1102, for example, capable of both collecting data and processing the data. In some cases, the sensors 1128 may be more limited in functionality, for example, collecting the data and allowing the data aggregators 1126 or gateways 1104 to process the data.

Communications from any IoT device 1102 may be passed along a convenient path (e.g., a most convenient path) between any of the IoT devices 1102 to reach the gateways 1104. In these networks, the number of interconnections provide substantial redundancy, allowing communications to be maintained, even with the loss of a number of IoT devices 1102. Further, the use of a mesh network may allow IoT devices 1102 that are very low power or located at a distance from infrastructure to be used, as the range to connect to another IoT device 1102 may be much less than the range to connect to the gateways 1104.

The fog 1120 provided from these IoT devices 1102 may be presented to devices in the cloud 1100, such as a server 1106, as a single device located at the edge of the cloud 1100, e.g., a fog device. In this example, the alerts coming from the fog device may be sent without being identified as coming from a specific IoT device 1102 within the fog 1120. In this fashion, the fog 1120 may be considered a distributed platform that provides computing and storage resources to perform processing or data-intensive tasks such as data analytics, data aggregation, and machine-learning, among others.

In some examples, the IoT devices 1102 may be configured using an imperative programming style, e.g., with each IoT device 1102 having a specific function and communication partners. However, the IoT devices 1102 forming the fog device may be configured in a declarative programming style, allowing the IoT devices 1102 to reconfigure their operations and communications, such as to determine needed resources in response to conditions, queries, and device failures. As an example, a query from a user located at a server 1106 about the operations of a subset of equipment monitored by the IoT devices 1102 may result in the fog 1120 device selecting the IoT devices 1102, such as particular sensors 1128, needed to answer the query. The data from these sensors 1128 may then be aggregated and analyzed by any combination of the sensors 1128, data aggregators 1126, or gateways 1104, before being sent on by the fog 1120 device to the server 1106 to answer the query. In this example, IoT devices 1102 in the fog 1120 may select the sensors 1128 used based on the query, such as adding data from flow sensors or temperature sensors. Further, if some of the IoT devices 1102 are not operational, other IoT devices 1102 in the fog 1120 device may provide analogous data, if available.

In other examples, the operations and functionality of embodiments described herein may be embodied by a IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 12:
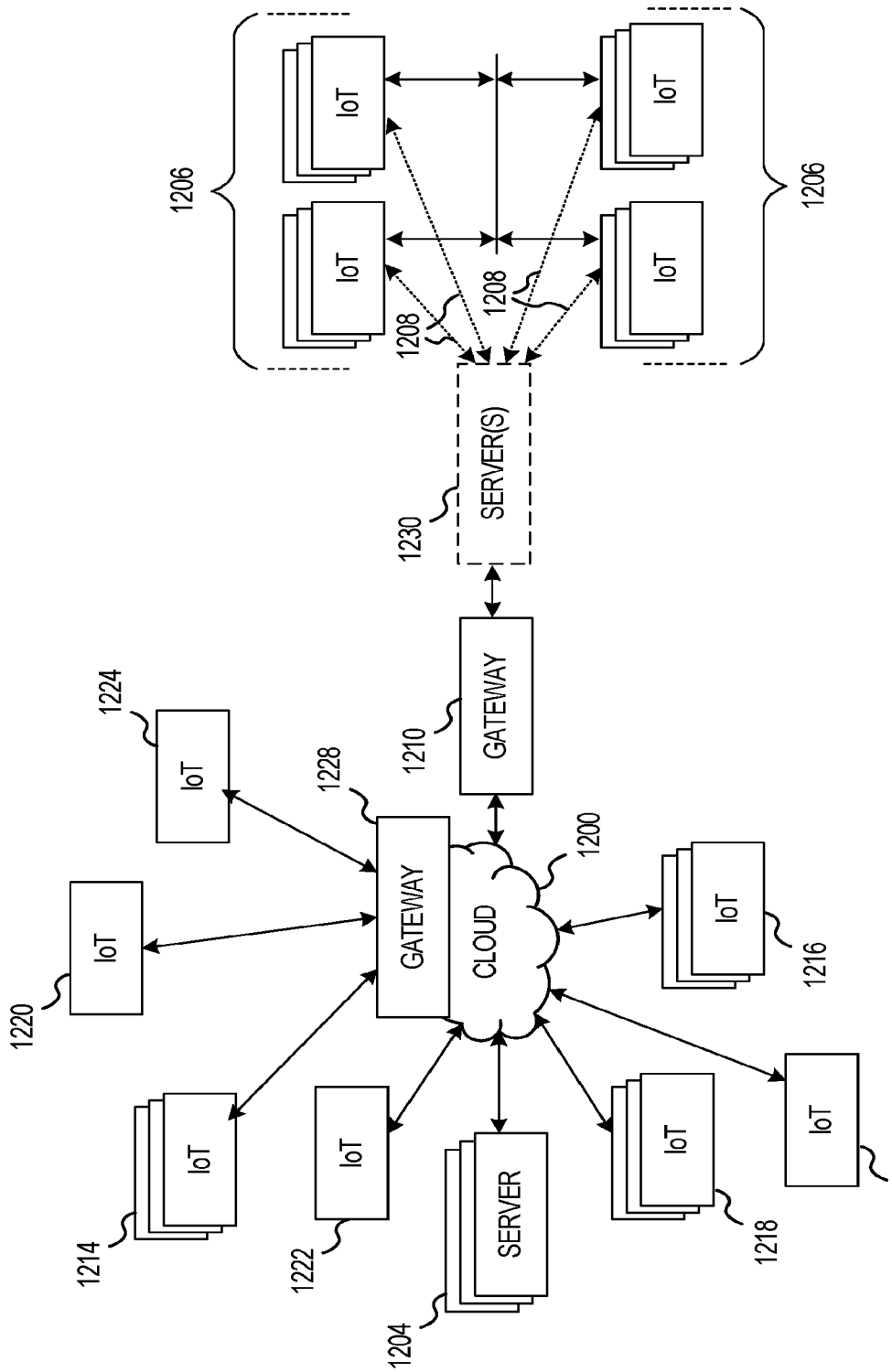
FIG. 12 illustrates a block diagram of a network illustrating communications among a number of IoT devices, according to an example.

FIG. 12 illustrates a drawing of a cloud computing network, or cloud 1200, in communication with a number of Internet of Things (IoT) devices. The cloud 1200 may represent the Internet, or may be a local area network (LAN), or a wide area network (WAN), such as a proprietary network for a company. The IoT devices may include any number of different types of devices, grouped in various combinations. For example, a traffic control group 1206 may include IoT devices along streets in a city. These IoT devices may include stoplights, traffic flow monitors, cameras, weather sensors, and the like. The traffic control group 1206, or other subgroups, may be in communication with the cloud 1200 through wired or wireless links 1208, such as LPWA links, optical links, and the like. Further, a wired or wireless sub-network 1212 may allow the IoT devices to communicate with each other, such as through a local area network, a wireless local area network, and the like. The IoT devices may use another device, such as a gateway 1310 or 1328 to communicate with remote locations such as the cloud 1300; the IoT devices may also use one or more servers 1330 to facilitate communication with the cloud 1300 or with the gateway 1310. For example, the one or more servers 1330 may operate as an intermediate network node to support a local edge cloud or fog implementation among a local area network. Further, the gateway 1328 that is depicted may operate in a cloud-to-gateway-to-many edge devices configuration, such as with the various IoT devices 1314, 1320, 1324 being constrained or dynamic to an assignment and use of resources in the cloud 1300.

Other example groups of IoT devices may include remote weather stations 1214, local information terminals 1216, alarm systems 1218, automated teller machines 1220, alarm panels 1222, or moving vehicles, such as emergency vehicles 1224 or other vehicles 1226, among many others. Each of these IoT devices may be in communication with other IoT devices, with servers 1204, with another IoT fog device or system (not shown, but depicted in FIG. 11), or a combination therein. The groups of IoT devices may be deployed in various residential, commercial, and industrial settings (including in both private or public environments).

As can be seen from FIG. 12, a large number of IoT devices may be communicating through the cloud 1200. This may allow different IoT devices to request or provide information to other devices autonomously. For example, a group of IoT devices (e.g., the traffic control group 1206) may request a current weather forecast from a group of remote weather stations 1214, which may provide the forecast without human intervention. Further, an emergency vehicle 1224 may be alerted by an automated teller machine 1220 that a burglary is in progress. As the emergency vehicle 1224 proceeds towards the automated teller machine 1220, it may access the traffic control group 1206 to request clearance to the location, for example, by lights turning red to block cross traffic at an intersection in sufficient time for the emergency vehicle 1224 to have unimpeded access to the intersection.

Clusters of IoT devices, such as the remote weather stations 1214 or the traffic control group 1206, may be equipped to communicate with other IoT devices as well as with the cloud 1200. This may allow the IoT devices to form an ad-hoc network between the devices, allowing them to function as a single device, which may be termed a fog device or system (e.g., as described above with reference to FIG. 11).

Figure 13:
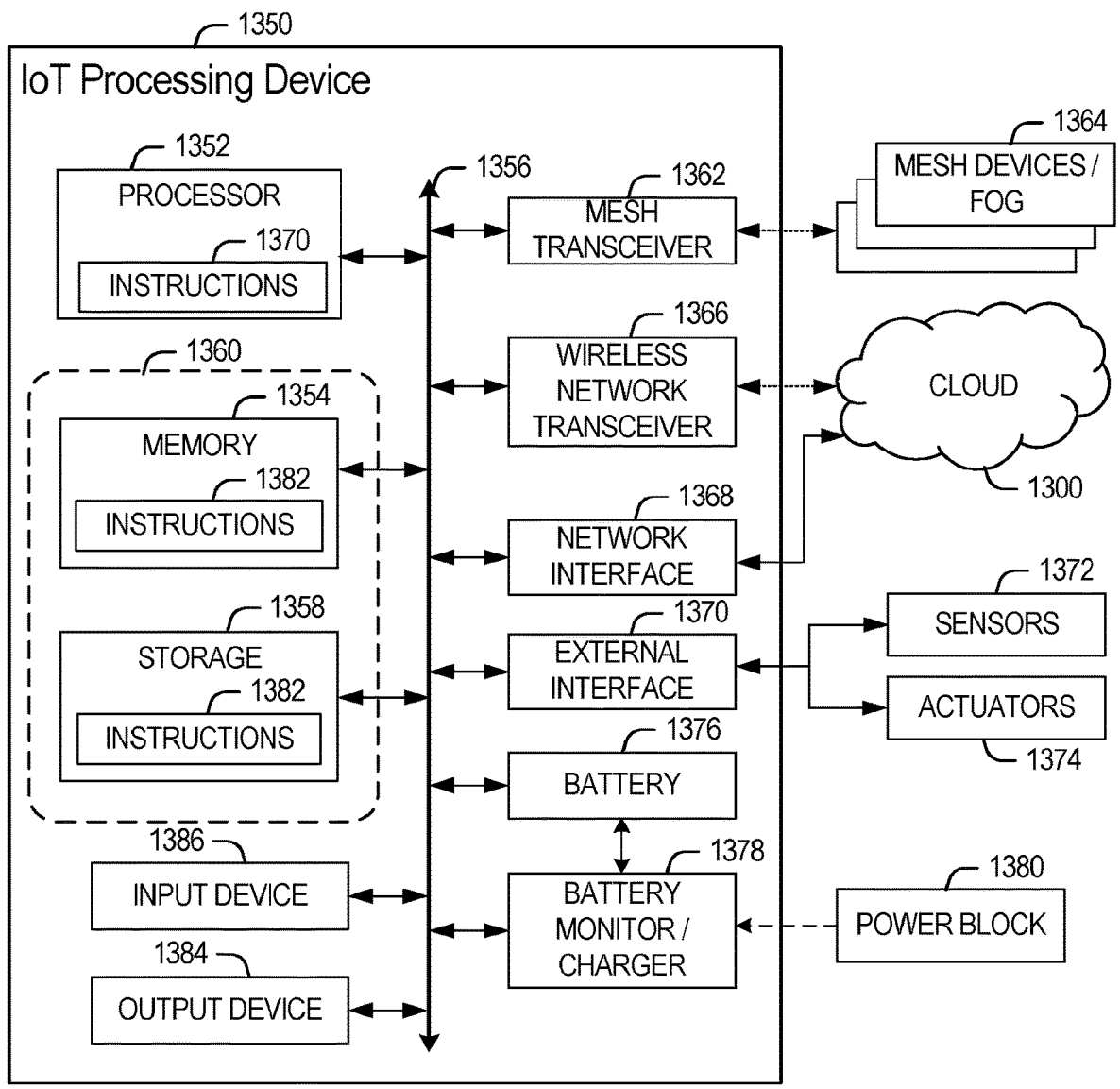
FIG. 13 illustrates a block diagram for an example IoT processing system architecture upon which any one or more of the techniques (e.g., operations, processes, methods, and methodologies) discussed herein may be performed, according to an example.

FIG. 13 is a block diagram of an example of components that may be present in an IoT device 1350 for implementing the techniques described herein. The IoT device 1350 may include any combinations of the components shown in the example or referenced in the disclosure above. The components may be implemented as ICs, portions thereof, discrete electronic devices, or other modules, logic, hardware, software, firmware, or a combination thereof adapted in the IoT device 1350, or as components otherwise incorporated within a chassis of a larger system. Additionally, the block diagram of FIG. 13 is intended to depict a high-level view of components of the IoT device 1350. However, some of the components shown may be omitted, additional components may be present, and different arrangement of the components shown may occur in other implementations.

The IoT device 1350 may include a processor 1352, which may be a microprocessor, a multi-core processor, a multithreaded processor, an ultra-low voltage processor, an embedded processor, or other known processing element. The processor 1352 may be a part of a system on a chip (SoC) in which the processor 1352 and other components are formed into a single integrated circuit, or a single package, such as the Edison or Galileo SoC boards from Intel. As an example, the processor 1352 may include an Intel® CORE based processor, such as a QUARK, an ATOM, an i3, an i5, an i7, or an MCU-class processor, or another such processor available from Intel® Corporation, Santa Clara, California. However, any number other processors may be used, such as available from Advanced Micro Devices, Inc. (AMD) of Sunnyvale, California, a MIPS-based design from MIPS Technologies, Inc. of Sunnyvale, California, an ARM-based design licensed from ARM Holdings, Ltd. or customer thereof, or their licensees or adopters. The processors may include units such as an A5-A10 processor from Apple® Inc., a SNAPDRAGON processor from Qualcomm® Technologies, Inc., or an OMAP processor from Texas Instruments, Inc.

The processor 1352 may communicate with a system memory 1354 over an interconnect 1356 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations, the individual memory devices may be of any number of different package types such as single die package (SDP), dual die package (DDP) or quad die package (QDP). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1358 may also couple to the processor 1352 via the interconnect 1356. In an example, the storage 1358 may be implemented via a solid state disk drive (SSDD). Other devices that may be used for the storage 1358 include flash memory cards, such as SD cards, microSD cards, xD picture cards, and the like, and USB flash drives. In low power implementations, the storage 1358 may be on-die memory or registers associated with the processor 1352. However, in some examples, the storage 1358 may be implemented using a micro hard disk drive (HDD). Further, any number of new technologies may be used for the storage 1358 in addition to, or instead of, the technologies described, such resistance change memories, phase change memories, holographic memories, or chemical memories, among others.

The components may communicate over the interconnect 1356. The interconnect 1356 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1356 may be a proprietary bus, for example, used in a SoC based system. Other bus systems may be included, such as an I2C interface, an SPI interface, point to point interfaces, and a power bus, among others.

The interconnect 1356 may couple the processor 1352 to a mesh transceiver 1362, for communications with other mesh devices 1364. The mesh transceiver 1362 may use any number of frequencies and protocols, such as 2.4 Gigahertz (GHz) transmissions under the IEEE 802.15.4 standard, using the Bluetooth® Low Energy (BLE) standard, as defined by the Bluetooth® Special Interest Group, or the ZigBee® standard, among others. Any number of radios, configured for a particular wireless communication protocol, may be used for the connections to the mesh devices 1364. For example, a WLAN unit may be used to implement Wi-Fi communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1362 may communicate using multiple standards or radios for communications at different range. For example, the IoT device 1350 may communicate with close devices, e.g., within about 10 meters, using a local transceiver based on BLE, or another low power radio, to save power. More distant mesh devices 1364, e.g., within about 50 meters, may be reached over ZigBee® or other intermediate power radios. Both communications techniques may take place over a single radio at different power levels, or may take place over separate transceivers, for example, a local transceiver using BLE and a separate mesh transceiver using ZigBee®.

A wireless network transceiver 1366 may be included to communicate with devices or services in the cloud 1300 via local or wide area network protocols. The wireless network transceiver 1366 may be a LPWA transceiver that follows the IEEE 802.15.4, or IEEE 802.15.4g standards, among others. The IoT device 1350 may communicate over a wide area using LoRaWAN (Long Range Wide Area Network) developed by Semtech® and the LoRa Alliance. The techniques described herein are not limited to these technologies, but may be used with any number of other cloud transceivers that implement long range, low bandwidth communications, such as SIGFOX, and other technologies. Further, other communications techniques, such as timeslotted channel hopping, described in the IEEE 802.15.4e specification may be used.

Any number of other radio communications and protocols may be used in addition to the systems mentioned for the mesh transceiver 1362 and wireless network transceiver 1366, as described herein. For example, the radio transceivers 1362 and 1366 may include an LTE or other cellular transceiver that uses spread spectrum (SPA/SAS) communications for implementing high speed communications. Further, any number of other protocols may be used, such as Wi-Fi networks for medium speed communications and provision of network communications.

The radio transceivers 1362 and 1366 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 1366, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1368 may be included to provide a wired communication to the cloud 1300 or to other devices, such as the mesh devices 1364. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 1368 may be included to allow connect to a second network, for example, a NIC 1368 providing communications to the cloud over Ethernet, and a second NIC 1368 providing communications to other devices over another type of network.

The interconnect 1356 may couple the processor 1352 to an external interface 1370 that is used to connect external devices or subsystems. The external devices may include sensors 1372, such as accelerometers, level sensors, flow sensors, optical light sensors, camera sensors, temperature sensors, a global positioning system (GPS) sensors, pressure sensors, barometric pressure sensors, and the like. The external interface 1370 further may be used to connect the IoT device 1350 to actuators 1374, such as power switches, valve actuators, an audible sound generator, a visual warning device, and the like.

In some optional examples, various input/output (I/O) devices may be present within, or connected to, the IoT device 1350. For example, a display or other output device 1384 may be included to show information, such as sensor readings or actuator position. An input device 1386, such as a touch screen or keypad may be included to accept input. An output device 1384 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 1350.

A battery 1376 may power the IoT device 1350, although in examples in which the IoT device 1350 is mounted in a fixed location, it may have a power supply coupled to an electrical grid. The battery 1376 may be a lithium ion battery, or a metal-air battery, such as a zinc-air battery, an aluminum-air battery, a lithium-air battery, and the like.

A battery monitor/charger 1378 may be included in the IoT device 1350 to track the state of charge (SoCh) of the battery 1376. The battery monitor/charger 1378 may be used to monitor other parameters of the battery 1376 to provide failure predictions, such as the state of health (SoH) and the state of function (SoF) of the battery 1376. The battery monitor/charger 1378 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 1378 may communicate the information on the battery 1376 to the processor 1352 over the interconnect 1356. The battery monitor/charger 1378 may also include an analog-to-digital (ADC) convertor that allows the processor 1352 to directly monitor the voltage of the battery 1376 or the current flow from the battery 1376. The battery parameters may be used to determine actions that the IoT device 1350 may perform, such as transmission frequency, mesh network operation, sensing frequency, and the like.

A power block 1380, or other power supply coupled to a grid, may be coupled with the battery monitor/charger 1378 to charge the battery 1376. In some examples, the power block 1380 may be replaced with a wireless power receiver to obtain the power wirelessly, for example, through a loop antenna in the IoT device 1350. A wireless battery charging circuit, such as an LTC4020 chip from Linear Technologies of Milpitas, California, among others, may be included in the battery monitor/charger 1378. The specific charging circuits chosen depend on the size of the battery 1376, and thus, the current required. The charging may be performed using the AIRFUEL standard promulgated by the Airfuel Alliance®, the Qi wireless charging standard promulgated by the Wireless Power Consortium, or the Rezence charging standard, promulgated by the Alliance for Wireless Power, among others.

The storage 1358 may include instructions 1382 in the form of software, firmware, or hardware commands to implement the techniques described herein. Although such instructions 1382 are shown as code blocks included in the memory 1354 and the storage 1358, it may be understood that any of the code blocks may be replaced with hardwired circuits, for example, built into an application specific integrated circuit (ASIC).

In an example, the instructions 1382 provided via the memory 1354, the storage 1358, or the processor 1352 may be embodied as a non-transitory, machine readable medium 1360 including code to direct the processor 1352 to perform electronic operations in the IoT device 1350. The processor 1352 may access the non-transitory, machine readable medium 1360 over the interconnect 1356. For instance, the non-transitory, machine readable medium 1360 may be embodied by devices described above for the storage 1358 or may include specific storage units such as optical disks, flash drives, or any number of other hardware devices. The non-transitory, machine readable medium 1360 may include instructions to direct the processor 1352 to perform a specific sequence or flow of actions, for example, as described with respect to the flowchart(s) and block diagram (s) of operations and functionality depicted above.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Exemplary Processors

Figure 14:
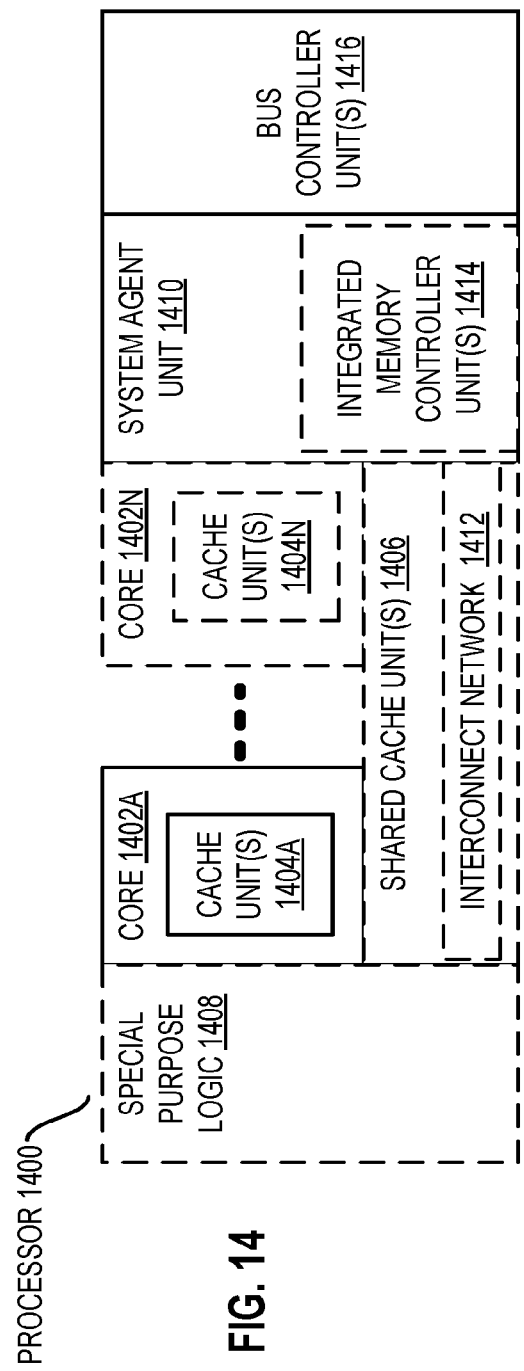
FIG. 14 is a block diagram of a processor 1400 that may have more than one core, may have an integrated memory controller, and may have integrated graphics according to embodiments of the invention.

FIG. 14 is a block diagram of a processor 1400 that may have more than one core, may have an integrated memory controller, and may have integrated graphics according to embodiments of the invention. The solid lined boxes in FIG. 14 illustrate a processor 1400 with a single core 1402A, a system agent 1410, a set of one or more bus controller units 1416, while the optional addition of the dashed lined boxes illustrates an alternative processor 1400 with multiple cores 1402A-N, a set of one or more integrated memory controller unit(s) 1414 in the system agent unit 1410, and special purpose logic 1408.

Thus, different implementations of the processor 1400 may include: 1) a CPU with the special purpose logic 1408 being integrated graphics and/or scientific (throughput) logic (which may include one or more cores), and the cores 1402A-N being one or more general purpose cores (e.g., general purpose in-order cores, general purpose out-of-order cores, a combination of the two); 2) a coprocessor with the cores 1402A-N being a large number of special purpose cores intended primarily for graphics and/or scientific (throughput); and 3) a coprocessor with the cores 1402A-N being a large number of general purpose in-order cores. Thus, the processor 1400 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1400 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1406, and external memory (not shown) coupled to the set of integrated memory controller units 1414. The set of shared cache units 1406 may include one or more mid-level caches, such as level 2 (L2), level 3 (L3), level 4 (L4), or other levels of cache, a last level cache (LLC), and/or combinations thereof. While in one embodiment a ring based interconnect unit 1412 interconnects the integrated graphics logic 1408 (integrated graphics logic 1408 is an example of and is also referred to herein as special purpose logic), the set of shared cache units 1406, and the system agent unit 1410/integrated memory controller unit(s) 1414, alternative embodiments may use any number of well-known techniques for interconnecting such units. In one embodiment, coherency is maintained between one or more cache units 1406 and cores 1402A-N.

In some embodiments, one or more of the cores 1402A-N are capable of multi-threading. The system agent 1410 includes those components coordinating and operating cores 1402A-N. The system agent unit 1410 may include for example a power control unit (PCU) and a display unit. The PCU may be or include logic and components needed for regulating the power state of the cores 1402A-N and the integrated graphics logic 1408. The display unit is for driving one or more externally connected displays.

The cores 1402A-N may be homogenous or heterogeneous in terms of architecture instruction set; that is, two or more of the cores 1402A-N may be capable of execution the same instruction set, while others may be capable of executing only a subset of that instruction set or a different instruction set.

Exemplary Computer Architectures

FIGS. 15-18 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 15:
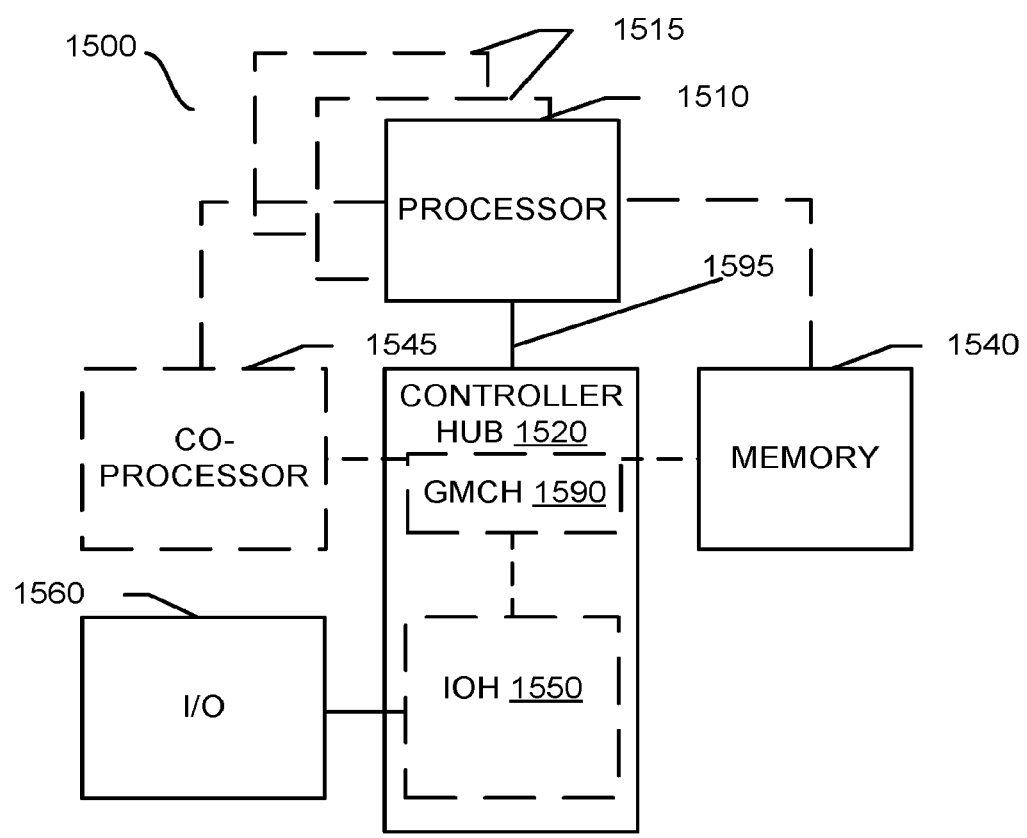
FIGS. 15-18 are block diagrams of exemplary computer architectures.

Referring now to FIG. 15, shown is a block diagram of a system 1500 in accordance with one embodiment of the present invention. The system 1500 may include one or more processors 1510, 1515, which are coupled to a controller hub 1520. In one embodiment, the controller hub 1520 includes a graphics memory controller hub (GMCH) 1590 and an Input/Output Hub (IOH) 1550 (which may be on separate chips); the GMCH 1590 includes memory and graphics controllers to which are coupled memory 1540 and a coprocessor 1545; the IOH 1550 couples input/output (I/O) devices 1560 to the GMCH 1590. Alternatively, one or both of the memory and graphics controllers are integrated within the processor (as described herein), the memory 1540 and the coprocessor 1545 are coupled directly to the processor 1510, and the controller hub 1520 in a single chip with the IOH 1550.

The optional nature of additional processors 1515 is denoted in FIG. 15 with broken lines. Each processor 1510, 1515 may include one or more of the processing cores described herein and may be some version of the processor 1400.

The memory 1540 may be, for example, dynamic random access memory (DRAM), phase change memory (PCM), or a combination of the two. For at least one embodiment, the controller hub 1520 communicates with the processor(s) 1510, 1515 via a multi-drop bus, such as a frontside bus (FSB), point-to-point interface such as QuickPath Interconnect (QPI), or similar connection 1595.

In one embodiment, the coprocessor 1545 is a special-purpose processor, such as, for example, a high-throughput MIC processor, a network or communication processor, compression engine, graphics processor, GPGPU, embedded processor, or the like. In one embodiment, controller hub 1520 may include an integrated graphics accelerator.

There can be a variety of differences between the physical resources 1510, 1515 in terms of a spectrum of metrics of merit including architectural, microarchitectural, thermal, power consumption characteristics, and the like.

In one embodiment, the processor 1510 executes instructions that control data processing operations of a general type. Embedded within the instructions may be coprocessor instructions. The processor 1510 recognizes these coprocessor instructions as being of a type that should be executed by the attached coprocessor 1545. Accordingly, the processor 1510 issues these coprocessor instructions (or control signals representing coprocessor instructions) on a coprocessor bus or other interconnect, to coprocessor 1545. Coprocessor(s) 1545 accept and execute the received coprocessor instructions.

Figure 16:
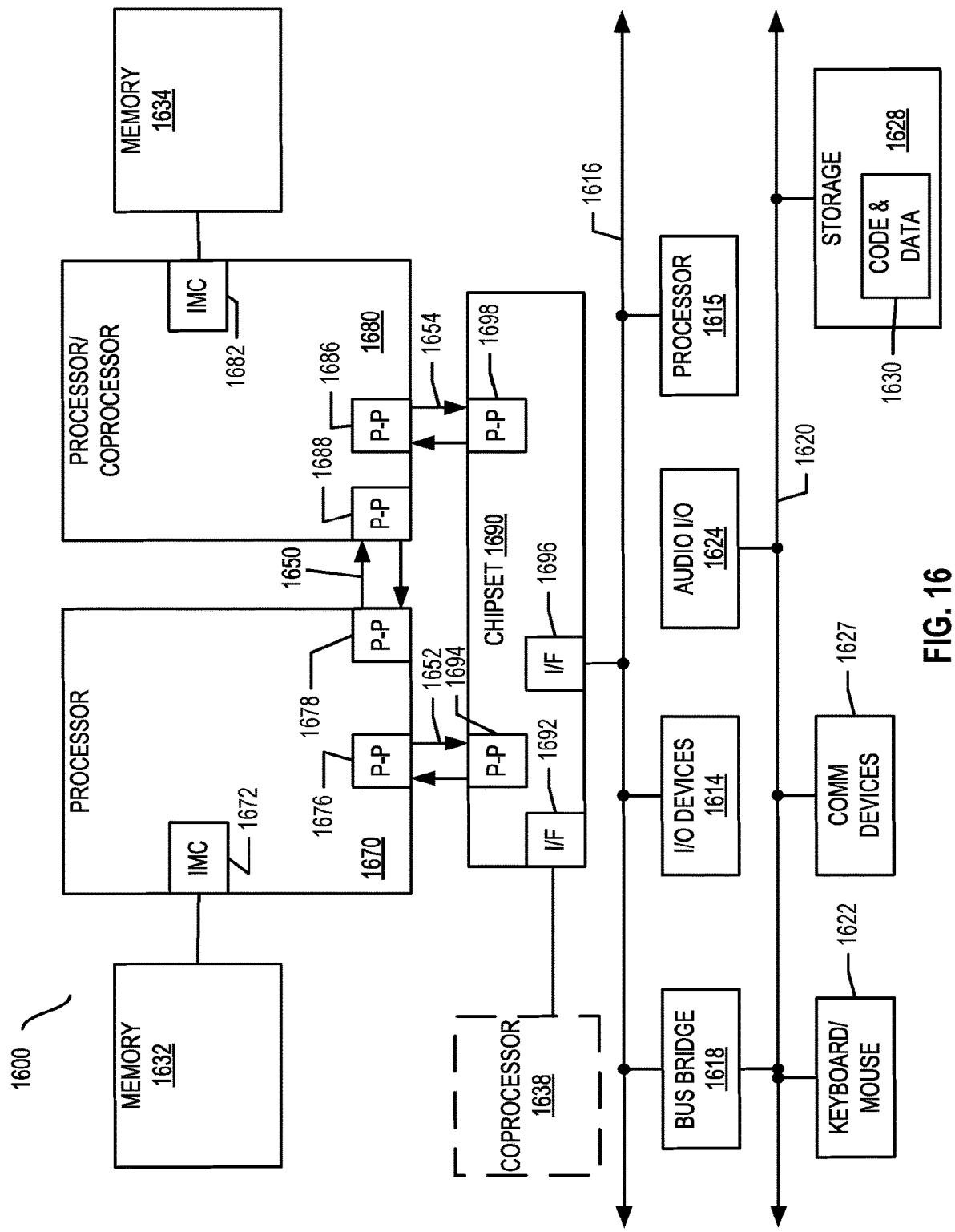

Referring now to FIG. 16, shown is a block diagram of a first more specific exemplary system 1600 in accordance with an embodiment of the present invention. As shown in FIG. 16, multiprocessor system 1600 is a point-to-point interconnect system, and includes a first processor 1670 and a second processor 1680 coupled via a point-to-point interconnect 1650. Each of processors 1670 and 1680 may be some version of the processor 1400. In one embodiment of the invention, processors 1670 and 1680 are respectively processors 1510 and 1515, while coprocessor 1638 is coprocessor 1545. In another embodiment, processors 1670 and 1680 are respectively processor 1510 coprocessor 1545.

Processors 1670 and 1680 are shown including integrated memory controller (IMC) units 1672 and 1682, respectively. Processor 1670 also includes as part of its bus controller units point-to-point (P-P) interfaces 1676 and 1678; similarly, second processor 1680 includes P-P interfaces 1686 and 1688. Processors 1670, 1680 may exchange information via a point-to-point (P-P) interface 1650 using P-P interface circuits 1678, 1688. As shown in FIG. 16, IMCs 1672 and 1682 couple the processors to respective memories, namely a memory 1632 and a memory 1634, which may be portions of main memory locally attached to the respective processors.

Processors 1670, 1680 may each exchange information with a chipset 1690 via individual P-P interfaces 1652, 1654 using point to point interface circuits 1676, 1694, 1686, 1698. Chipset 1690 may optionally exchange information with the coprocessor 1638 via a high-performance interface 1692. In one embodiment, the coprocessor 1638 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1690 may be coupled to a first bus 1616 via an interface 1696. In one embodiment, first bus 1616 may be a Peripheral Component Interconnect (PCI) bus, or a bus such as a PCI Express bus or another third generation I/O interconnect bus, although the scope of the present invention is not so limited.

As shown in FIG. 16, various I/O devices 1614 may be coupled to first bus 1616, along with a bus bridge 1618 which couples first bus 1616 to a second bus 1620. In one embodiment, one or more additional processor(s) 1615, such as coprocessors, high-throughput MIC processors, GPGPU's, accelerators (such as, e.g., graphics accelerators or digital signal processing (DSP) units), field programmable gate arrays, or any other processor, are coupled to first bus 1616. In one embodiment, second bus 1620 may be a low pin count (LPC) bus. Various devices may be coupled to a second bus 1620 including, for example, a keyboard and/or mouse 1622, communication devices 1627 and a storage unit 1628 such as a disk drive or other mass storage device which may include instructions/code and data 1630, in one embodiment. Further, an audio I/O 1624 may be coupled to the second bus 1620. Note that other architectures are possible. For example, instead of the point-to-point architecture of FIG. 16, a system may implement a multi-drop bus or other such architecture.

Figure 17:
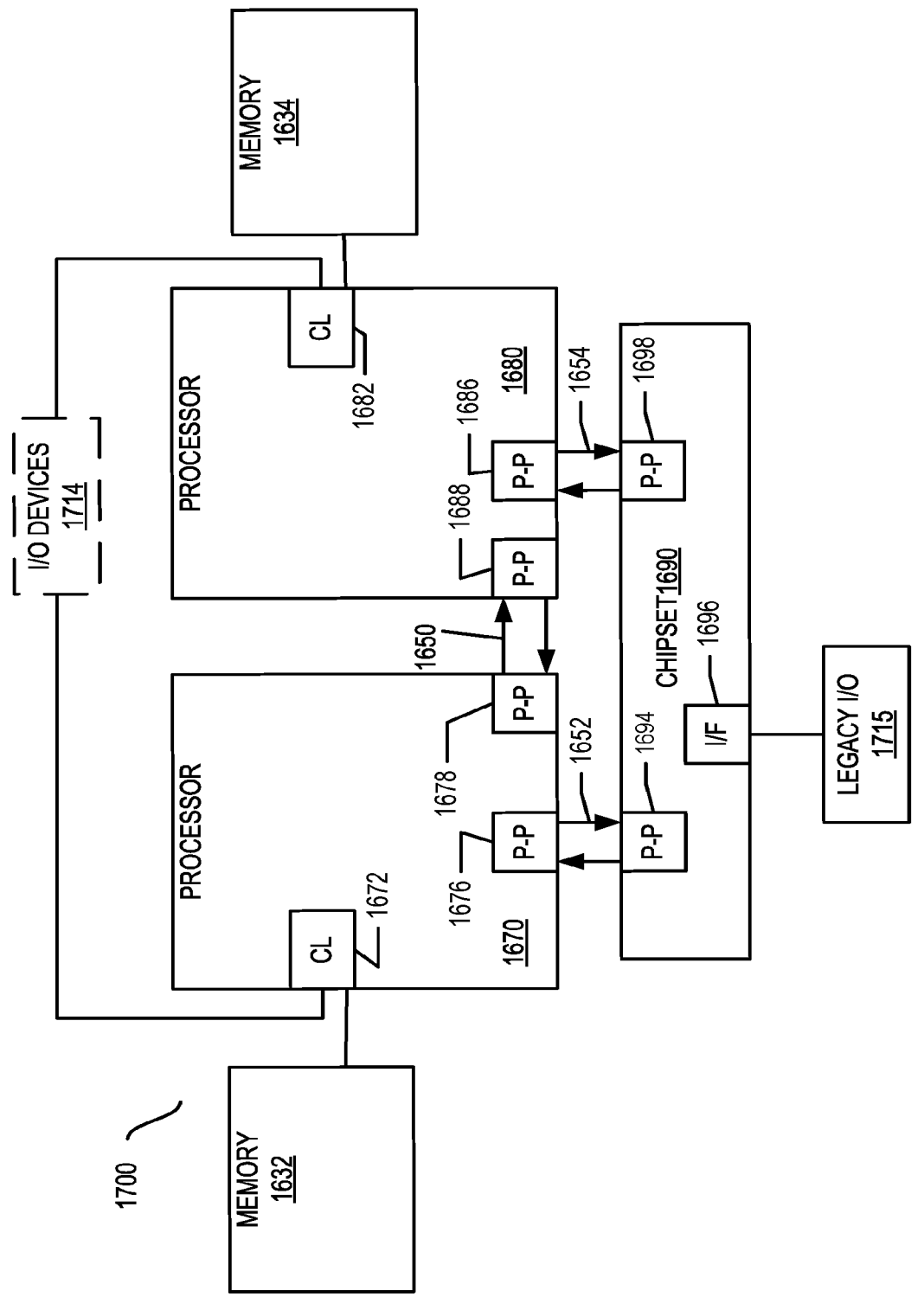

Referring now to FIG. 17, shown is a block diagram of a second more specific exemplary system 1700 in accordance with an embodiment of the present invention. Like elements in FIGS. 16 and 17 bear like reference numerals, and certain aspects of FIG. 16 have been omitted from FIG. 17 in order to avoid obscuring other aspects of FIG. 17.

FIG. 17 illustrates that the processors 1670, 1680 may include integrated memory and I/O control logic ("CL") 1672 and 1682, respectively. Thus, the CL 1672, 1682 include integrated memory controller units and include I/O control logic. FIG. 17 illustrates that not only are the memories 1632, 1634 coupled to the CL 1672, 1682, but also that I/O devices 1714 are also coupled to the control logic 1672, 1682. Legacy I/O devices 1715 are coupled to the chipset 1690.

Figure 18:
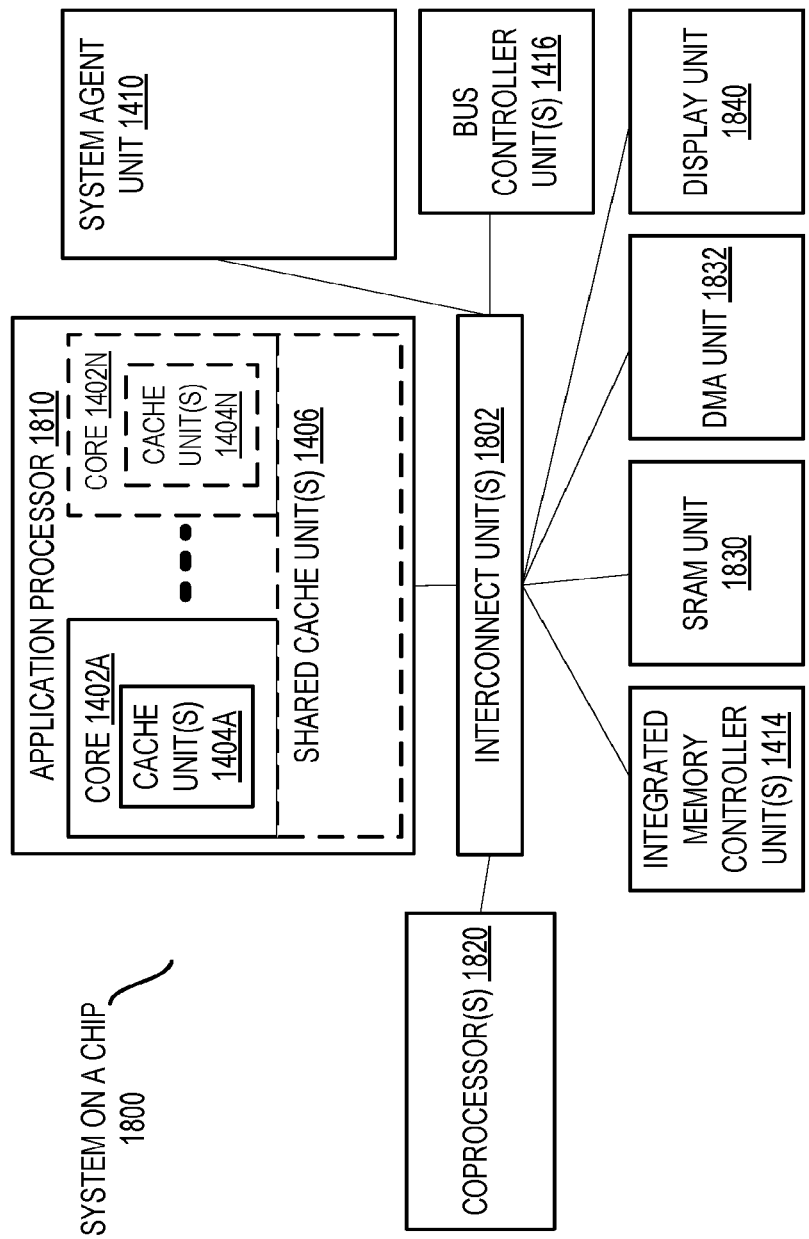

Referring now to FIG. 18, shown is a block diagram of a SoC 1800 in accordance with an embodiment of the present invention. Similar elements in FIG. 14 bear like reference numerals. Also, dashed lined boxes are optional features on more advanced SoCs. In FIG. 18, an interconnect unit(s) 1802 is coupled to: an application processor 1810 which includes a set of one or more cores 1402A-N, which include cache units 1404A-N, and shared cache unit(s) 1406; a system agent unit 1410; a bus controller unit(s) 1416; an integrated memory controller unit(s) 1414; a set or one or more coprocessors 1820 which may include integrated graphics logic, an image processor, an audio processor, and a video processor; an static random access memory (SRAM) unit 1830; a direct memory access (DMA) unit 1832; and a display unit 1840 for coupling to one or more external displays. In one embodiment, the coprocessor(s) 1820 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1630 illustrated in FIG. 16, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 19:
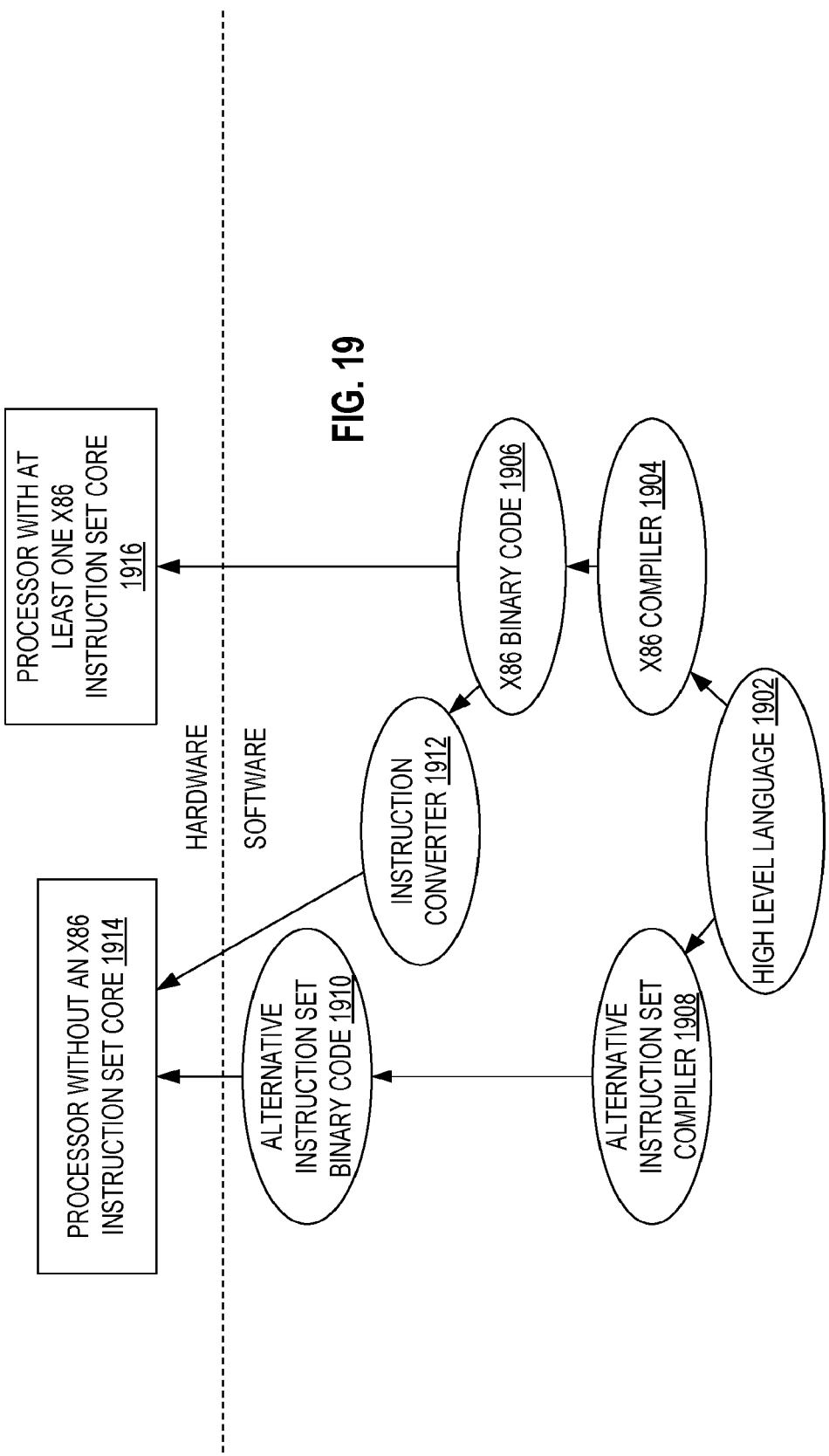
FIG. 19 is a block diagram contrasting the use of a software instruction converter to convert binary instructions in a source instruction set to binary instructions in a target instruction set according to embodiments of the invention.

FIG. 19 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 19 shows a program in a high level language 1902 may be compiled using an x86 compiler 1904 to generate x86 binary code 1906 that may be natively executed by a processor with at least one x86 instruction set core 1916. The processor with at least one x86 instruction set core 1916 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1904 represents a compiler that is operable to generate x86 binary code 1906 (e.g., object code) that can, with or without additional linkage processing, be executed on the processor with at least one x86 instruction set core 1916. Similarly, FIG. 19 shows the program in the high level language 1902 may be compiled using an alternative instruction set compiler 1908 to generate alternative instruction set binary code 1910 that may be natively executed by a processor without at least one x86 instruction set core 1914 (e.g., a processor with cores that execute the MIPS instruction set of MIPS Technologies of Sunnyvale, CA and/or that execute the ARM instruction set of ARM Holdings of Sunnyvale, CA). The instruction converter 1912 is used to convert the x86 binary code 1906 into code that may be natively executed by the processor without an x86 instruction set core 1914. This converted code is not likely to be the same as the alternative instruction set binary code 1910 because an instruction converter capable of this is difficult to make; however, the converted code will accomplish the general operation and be made up of instructions from the alternative instruction set. Thus, the instruction converter 1912 represents software, firmware, hardware, or a combination thereof that, through emulation, simulation or any other process, allows a processor or other electronic device that does not have an x86 instruction set processor or core to execute the x86 binary code 1906.

FURTHER EXAMPLES

Example 1 provides a method of servicing data flows of a plurality of wireless devices using a plurality of protocols, the method comprising monitoring one or more interfaces that communicate using the plurality of protocols, activating a first interface upon detecting a demand to exchange data thereon, and powering down a second interface upon passage of a threshold amount of idle time, wherein a connectivity manager performs the monitoring, activating, and powering down, extracting, by a packet analyzer, packet metadata from one or more of the data flows, determining latency encountered and latency criteria for the one or more data flows based on the packet metadata, and applying a latency reduction strategy to attempt to comply with the latency criteria, wherein the determining and applying are to be performed by an adaptive connectivity manager (ACM), and determining bandwidth utilized and bandwidth criteria for the one or more data flows, and applying a bandwidth reduction strategy to attempt to comply with the bandwidth criteria, wherein the determining and applying are to be performed by a bandwidth utilization manager (BUM).

Example 2 includes the substance of the exemplary method of Example 1, wherein the connectivity manager, the ACM, and the BUM comprise circuitry to be incorporated into an edge device, the edge device to connect a local area network (LAN) to a wide area network (WAN), the LAN to include the plurality of wireless devices, and the WAN to include the Internet.

Example 3 includes the substance of the exemplary method of Example 1, wherein at least one of the connectivity manager, the ACM, and the BUM is implemented using a virtual machine.

Example 4 includes the substance of the exemplary method of Example 1, further comprising: receiving data reception status from each of the plurality of interfaces, activating at least the first interface when the data reception status of the first interface indicates that the data packet has been received, and setting at least the second interface to a low power mode when the data reception status of the second interface indicates that no packets have been received for the threshold amount of time, wherein the receiving, activating, and setting are to be performed by the connectivity manager.

Example 5 includes the substance of the exemplary method of Example 1, wherein the latency reduction strategy comprises at least one of: sending a same data packet simultaneously over multiple interfaces, and discarding redundant data packets, using a different interface with reduced latency to relay the one or more data flows, and using a different protocol to relay the one or more data flows.

Example 6 includes the substance of the exemplary method of Example 1, wherein the bandwidth reduction strategy comprises at least one of: buffering data packets of the one or more data flows for later off-peak transmission, throttling the bandwidth of packets generated at a source of the one or more data flows, and when multiple packets are received simultaneously, splitting the bandwidth utilized by the one or more data flows into multiple partitions, and allocating different bandwidth partitions to transmit multiple packets simultaneously.

Example 7 includes the substance of the exemplary method of Example 1, wherein the multiple protocols comprise at least Bluetooth®, Bluetooth® Low Energy (BLE), Long Term Evolution (LTE), Universal Mode Telecommunication Service (UMTS), Global Method for Mobile Communications (GSM), second generation wireless protocol (2G), third generation wireless protocol (3G), fourth generation wireless protocol (4G), Near-Field-Communications (NFC), ZigBee®, and protocols standardized by the Institute of Electrical and Electronics Engineers (IEEE), including IEEE 802.11, IEEE 802.16, and IEEE 802.18.

Example 8 includes the substance of the exemplary method of any one of Examples 1-7, wherein at least some of the wireless devices are brownfield devices not originally designed to connect to a WAN.

Example 9 includes the substance of the exemplary method of any one of Examples 1-7, wherein at least some of the wireless devices are Internet of Things (IoT) devices.

Example 10 includes the substance of the exemplary method of any one of Examples 1-7, wherein the packet analyzer, the connectivity manager, the ACM, and the BUM are part of an IoT gateway.

Example 11 provides a system comprising: a wireless network, a plurality of interfaces to communicate data flows with a plurality of wireless devices using multiple protocols, a connectivity manager (CM) to monitor one or more interfaces of the plurality of interfaces, activate a first interface upon detecting a demand to exchange data thereon, and power down a second interface upon passage of a threshold amount of idle time, a packet analyzer to extract packet metadata from one or more of the data flows, an adaptive connectivity manager (ACM) to: determine latency encountered and latency criteria based on the packet metadata for the one or more data flows, and apply a latency reduction strategy to try to comply with the latency criteria, and a bandwidth utilization manager (BUM) to: determine bandwidth utilized and bandwidth criteria for the one or more data flows, and apply a bandwidth reduction strategy to attempt to comply with the bandwidth criteria.

Example 12 includes the substance of the exemplary system of Example 11, wherein the connectivity manager, the ACM, and the BUM comprise circuitry to be incorporated into an edge device, the edge device to connect a local area network (LAN) to a wide area network (WAN), the LAN to include the plurality of wireless devices, and the WAN to include the Internet.

Example 13 includes the substance of the exemplary system of Example 11, further comprising a processor to implement a virtual machine host system, wherein at least one of the connectivity manager, ACM, and BUM is to be implemented by the processor using a virtual machine.

Example 14 includes the substance of the exemplary system of Example 11, wherein the connectivity manager is to: receive data reception status from each of the plurality of interfaces, activate the first interface when the data reception status of the first interface indicates that the data packet has been received, and set the second interface to a low power mode when the data reception status of the second interface indicates that no packets have been received for the threshold amount of time.

Example 15 includes the substance of the exemplary system of Example 11, wherein the latency reduction strategy comprises at least one of: sending a same data packet simultaneously over multiple interfaces, and discarding redundant data packets, using a different interface with reduced latency to relay the one or more data flows, and using a different protocol to relay the one or more data flows.

Example 16 includes the substance of the exemplary system of Example 11, wherein the bandwidth reduction strategy comprises at least one of: buffering data packets of the second data flow for later off-peak transmission, throttling the bandwidth of packets generated by the second data flow, and when multiple packets are received simultaneously, splitting the bandwidth utilized by the one or more data flows into multiple partitions, and allocating a different bandwidth partition for use by the multiple packets.

Example 17 includes the substance of the exemplary system of Example 11, wherein the multiple protocols comprise at least Bluetooth, Bluetooth® Low Energy (BLE), Long Term Evolution (LTE), Universal Mode Telecommunication Service (UMTS), Global System for Mobile Communications (GSM), second generation wireless protocol (2G), third generation wireless protocol (3G), fourth generation wireless protocol (4G), Near-Field-Communications (NFC), ZigBee®, and protocols standardized by the Institute of Electrical and Electronics Engineers (IEEE), including IEEE 802.11, IEEE 802.16, and IEEE 802.18.

Example 18 includes the substance of the exemplary system of Example 11, wherein at least some of the wireless devices are brownfield devices not originally designed to connect to a WAN.

Example 19 includes the substance of the exemplary system of Example 11, wherein at least some of the wireless devices are Internet of Things (IoT) devices.

Example 20 includes the substance of the exemplary system of Example 11, wherein the packet analyzer, the connectivity manager, the ACM, and the BUM are part of an IoT gateway.

Example 21 provides a non-transitory computer-readable medium containing instructions that, when executed by a processor, cause the processor to service data flows of a plurality of wireless devices using a plurality of protocols by: monitoring one or more interfaces that communicate using the plurality of protocols, activating a first interface upon detecting a demand to exchange data thereon, and powering down a second interface upon passage of a threshold amount of idle time, wherein a connectivity manager performs the monitoring, activating, and powering down, extracting, by a packet analyzer, packet metadata from one or more of the data flows, determining latency encountered and latency criteria for the one or more data flows based on the packet metadata, and applying a latency reduction strategy to attempt to comply with the latency criteria, wherein the determining and applying are to be performed by an adaptive connectivity manager (ACM), and determining bandwidth utilized and bandwidth criteria for the one or more data flows, and applying a bandwidth reduction strategy to attempt to comply with the bandwidth criteria, wherein the determining and applying are to be performed by a bandwidth utilization manager (BUM).

Example 22 includes the substance of the exemplary non-transitory computer-readable medium of Example 21, wherein the connectivity manager, the ACM, and the BUM comprise circuitry to be incorporated into an edge device, the edge device to connect a local area network (LAN) to a wide area network (WAN), the LAN to include the plurality of wireless devices, and the WAN to include the Internet.

Example 23 includes the substance of the exemplary non-transitory computer-readable medium of Example 21, wherein at least one of the connectivity manager, the ACM, and the BUM is implemented using a virtual machine.

Example 24 includes the substance of the exemplary non-transitory computer-readable medium of Example 21, further comprising: receiving data reception status from each of the plurality of interfaces; activating at least the first interface when the data reception status of the first interface indicates that the data packet has been received; and setting at least the second interface to a low power mode when the data reception status of the second interface indicates that no packets have been received for the threshold amount of time, wherein the receiving, activating, and setting are to be performed by the connectivity manager.

Example 25 includes the substance of the exemplary non-transitory computer-readable medium of Example 21, wherein the latency reduction strategy comprises at least one of: sending a same data packet simultaneously over multiple interfaces, and discarding redundant data packets, using a different interface with reduced latency to relay the one or more data flows, and using a different protocol to relay the one or more data flows.

Example 26 includes the substance of the exemplary non-transitory computer-readable medium of Example 21, wherein the bandwidth reduction strategy comprises at least one of: buffering data packets of the one or more data flows for later off-peak transmission, throttling the bandwidth of packets generated at a source of the one or more data flows, and when multiple packets are received simultaneously, splitting the bandwidth utilized by the one or more data flows into multiple partitions, and allocating different bandwidth partitions to transmit multiple packets simultaneously.

Example 27 includes the substance of the exemplary non-transitory computer-readable medium of Example 21, wherein the multiple protocols comprise at least Bluetooth®, Bluetooth® Low Energy (BLE), Long Term Evolution (LTE), Universal Mode Telecommunication Service (UMTS), Global Method for Mobile Communications (GSM), second generation wireless protocol (2G), third generation wireless protocol (3G), fourth generation wireless protocol (4G), Near-Field-Communications (NFC), ZigBee®, and protocols standardized by the Institute of Electrical and Electronics Engineers (IEEE), including IEEE 802.11, IEEE 802.16, and IEEE 802.18.

Example 28 includes the substance of the exemplary non-transitory computer-readable medium of any one of Examples 21-27, wherein at least some of the wireless devices are brownfield devices not originally designed to connect to a WAN.

Example 29 includes the substance of the exemplary non-transitory computer-readable medium of any one of Examples 21-27, wherein at least some of the wireless devices are Internet of Things (IoT) devices.

Example 30 includes the substance of the exemplary non-transitory computer-readable medium of any one of Examples 21-27, wherein the packet analyzer, the connectivity manager, the ACM, and the BUM are part of an IoT gateway.

What is claimed is:

1. An apparatus comprising:
   a packet analyzer circuitry to extract packet metadata from data flows to determine a metric corresponding to the data flows; and
   a bandwidth utilization circuitry to adapt the metric corresponding to the data flows to conform to criteria of a service level agreement (SLA); and
   an adaptive connectivity manager circuitry to switch between different interfaces to meet the SLA associated with the data flows by:
   activating a first interface in response to detecting a demand to exchange data; and
   powering down a second interface in response to a threshold amount of idle time.

2. The apparatus of claim 1, wherein the bandwidth utilization circuitry switches a bandwidth to relay data from a Wi-Fi standard to a Bluetooth standard.

3. The apparatus of claim 1, further including a bandwidth utilization manager to further reduce the metric of the data flow by one or more of:
   using a lower-bandwidth interface to relay the data;
   borrowing bandwidth from a peer device; or
   throttling the peer device.

4. The apparatus of claim 1, wherein the data flow is a first data flow, further including bandwidth utilization manager circuitry to further reduce the metric of the data flow by one or more of:
   sending a second same data packet simultaneously over multiple multi-hop paths;
   selecting a multi-hop path of the multi-hop paths that conforms to the SLA; and
   using the multi-hop path to relay a second data flow.

5. The apparatus of claim 1, wherein the metric includes at least one of bandwidth, uptime, or latency.

6. An apparatus comprising:
memory;
instructions; and
programmable circuitry to execute the instructions to:
extract packet metadata from data flows to determine a metric corresponding to the data flows; and
reduce the metric corresponding to the data flows to satisfy criteria of a service level agreement (SLA); and
switch between different interfaces to meet the SLA associated with the data flows by:
activating a first interface in response to detecting a demand to exchange data; and
powering down a second interface in response to a threshold amount of idle time.

7. The apparatus of claim 6, wherein the programmable circuitry is to further switch a bandwidth to relay data from a Wi-Fi standard to a Bluetooth standard.

8. The apparatus of claim 6, wherein the programmable circuitry is to further reduce the metric of the data flow by one or more of:
using a lower-bandwidth interface to relay the data;
borrowing bandwidth from a peer device; or
throttling the peer device.

9. The apparatus of claim 6, wherein the data flow is a first data flow, the programmable circuitry to further reduce the metric of the data flow by one or more of:
sending a second same data packet simultaneously over multiple multi-hop paths;
selecting a multi-hop path of the multi-hop paths that conforms to the SLA; and
using the multi-hop path to relay a second data flow.

10. The apparatus of claim 6, wherein the metric includes at least one of bandwidth, uptime, or latency.

11. A non-transitory computer readable storage medium comprising instructions which, when executed, cause programmable circuitry to at least:
determine a metric corresponding to data flows by extracting packet metadata from the data flows; and
lower the metric corresponding to the data flows to conform to criteria of a service level agreement (SLA); and switch between different interfaces to meet the SLA associated with the data flow by:
activating a first interface in response to detecting a demand to exchange data; and
powering down a second interface in response to a threshold amount of idle time.

12. The non-transitory computer readable storage medium of claim 11, wherein the instructions cause the programmable circuitry to further adjust a bandwidth to relay data from a Wi-Fi standard to a Bluetooth standard.

13. The non-transitory computer readable storage medium of claim 11, wherein the instructions cause the programmable circuitry to further reduce the metric of the data flow by one or more of:
using a lower-bandwidth interface to relay the data;
borrowing bandwidth from a peer device; or
throttling the peer device.

14. The non-transitory computer readable storage medium of claim 11, wherein the data flow is a first data flow, the instructions to cause the programmable circuitry to further reduce the metric of the data flow by one or more of:
sending a second same data packet simultaneously over multiple multi-hop paths;
selecting a multi-hop path of the multi-hop paths that conforms to the SLA; and
using the multi-hop path to relay a second data flow.

15. The non-transitory computer readable storage medium of claim 11, wherein the metric includes at least one of bandwidth, uptime, or latency.

16. A method comprising:
extracting packet metadata from data flows to determine a metric corresponding to the data flows; and
reducing, by executing an instruction with at least one processor, the metric corresponding to the data flows to conform to criteria of a service level agreement (SLA); and switching between different interfaces to meet the SLA associated with the data flows by:
activating a first interface in response to detecting a demand to exchange data; and
powering down a second interface in response to a threshold amount of idle time.

17. The method of claim 16, further including switching a bandwidth to relay data from a Wi-Fi standard to a Bluetooth standard.

18. The method of claim 16, further including reducing the metric of the data flow by one or more of:
using a lower-bandwidth interface to relay the data;
borrowing bandwidth from a peer device; or
throttling the peer device.

19. The method of claim 16, wherein the data flow is a first data flow, further including reducing the metric of the data flow by one or more of:
sending a second same data packet simultaneously over multiple multi-hop paths;
selecting a multi-hop path of the multi-hop paths that conforms to the SLA; and
using the multi-hop path to relay a second data flow.

20. The method of claim 16, wherein the metric includes at least one of bandwidth, uptime, or latency.

21. The apparatus of claim 1, further including adaptive connectivity manager circuitry to:
determine that the criteria of the SLA is not satisfied; and
determine that the criteria of the SLA can be satisfied by switching to a lower-bandwidth standard.

* * * * *